(12) United States Patent
Bogatko et al.

(10) Patent No.: US 12,560,716 B2
(45) Date of Patent: Feb. 24, 2026

(54) LIGHT DETECTORS FOR NEARBY OBJECT DETECTION IN LIGHT DETECTION AND RANGING (LIDAR) DEVICES

(71) Applicant: Waymo LLC, Mountain View, CA (US)

(72) Inventors: Alex Bogatko, Mountain View, CA (US); Caner Onal, Palo Alto, CA (US); Paul Karplus, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 927 days.

(21) Appl. No.: 17/806,629

(22) Filed: Jun. 13, 2022

(65) Prior Publication Data

US 2023/0408691 A1 Dec. 21, 2023

(51) Int. Cl.
| | |
|---|---|
| *G01S 17/14* | (2020.01) |
| *G01S 7/481* | (2006.01) |
| *G01S 7/4861* | (2020.01) |
| *G01S 17/42* | (2006.01) |

(Continued)

(52) U.S. Cl.
CPC ............ *G01S 17/14* (2020.01); *G01S 7/4817* (2013.01); *G01S 7/4861* (2013.01); *G01S 17/42* (2013.01); *G01S 17/894* (2020.01); *G01S 17/931* (2020.01)

(58) Field of Classification Search
CPC .......... G01S 7/497; G01S 7/40; G01S 7/4865; G01S 7/4816; G01S 17/10; G01S 5/021; G01S 17/88; G01J 2001/446; H01S 5/026
See application file for complete search history.

(56) References Cited

U.S. PATENT DOCUMENTS

| | | | |
|---|---|---|---|
| 9,029,772 B2 | 5/2015 | Pavlov | |
| 9,048,370 B1 | 6/2015 | Urmson et al. | |
| 10,139,478 B2 | 11/2018 | Gaalema et al. | |

(Continued)

FOREIGN PATENT DOCUMENTS

| | | | | | |
|---|---|---|---|---|---|
| CN | 110646829 A | * | 1/2020 | ............. | G01T 1/248 |
| CN | 115728746 A | * | 3/2023 | ............. | G01S 7/489 |

(Continued)

OTHER PUBLICATIONS

CN-115728746-A (Year: 2023).*

(Continued)

*Primary Examiner* — Sanjiv D. Patel
(74) *Attorney, Agent, or Firm* — McDonnell Boehnen Hulbert & Berghoff LLP

(57) ABSTRACT

Example embodiments relate to light detectors for nearby object detection in light detection and ranging (lidar) devices. An example embodiment includes a lidar device. The lidar device includes a light emitter configured to emit a light signal at a first time. The lidar device also includes a light detector configured to detect the emitted light signal. Additionally, the lidar device includes a biasing circuit configured to modify a detector bias using a bias signal. The bias signal ramps the detector bias from a first bias level at the first time to a second bias level at a second time. The second time is separated from the first time by a ramp duration. The ramp duration is sufficient to prevent any internal feedback within the lidar device caused by the emitted light signal from saturating the light detector or detection circuitry associated with the light detector.

20 Claims, 23 Drawing Sheets

1000

1002

Emit, by a light emitter of a light detection and ranging (lidar) device, a light signal at a first time

1004

Detect, by a light detector of the lidar device, the light signal emitted by the light emitter

1006

Modify, by a biasing circuit of the lidar device, a detector bias of the light detector using a bias signal

(51) Int. Cl.
      *G01S 17/894*        (2020.01)
      *G01S 17/931*        (2020.01)

(56)              References Cited

U.S. PATENT DOCUMENTS

| 10,234,546 | B2 | 3/2019 | Droz et al. |
| 10,304,987 | B2 | 5/2019 | Droz et al. |
| 10,324,171 | B2 | 6/2019 | Niclass et al. |
| 11,029,396 | B1 | 6/2021 | Droz et al. |
| 2008/0225915 | A1 | 9/2008 | McCormack |
| 2012/0261516 | A1 | 10/2012 | Gilliland et al. |
| 2013/0135606 | A1 | 5/2013 | Giacotto |
| 2020/0033452 | A1 | 1/2020 | Takagawa et al. |
| 2021/0156972 | A1 | 5/2021 | Droz et al. |
| 2021/0173047 | A1* | 6/2021 | Droz ..................... G01S 7/484 |
| 2021/0270965 | A1 | 9/2021 | Liu et al. |
| 2021/0341586 | A1 | 11/2021 | Holleczek et al. |
| 2021/0396857 | A1 | 12/2021 | Fu et al. |
| 2022/0057496 | A1 | 2/2022 | Bennington et al. |
| 2024/0192339 | A1* | 6/2024 | Zhao ..................... G01S 17/10 |

FOREIGN PATENT DOCUMENTS

| EP | 3588132 | A1 | 1/2020 |
| JP | H09-105776 | A | 4/1997 |
| JP | 2007-214564 | A | 8/2007 |
| JP | 2018-013370 | A | 1/2018 |
| KR | 101927130 | B1 | 12/2018 |
| WO | 2018/151226 | A1 | 8/2018 |
| WO | 2021024038 | A1 | 2/2021 |
| WO | 2021150448 | A1 | 7/2021 |
| WO | 2021213103 | A1 | 10/2021 |

OTHER PUBLICATIONS

CN-110646829-A (Year: 2020).*

"How does temperature affect the gain of an SiPM?"; Hamamatsu Photonics; retrieved from URL: https://hub.hamamatsu.com/us/en/technical-notes/mppc-sipms/how-does-temperature-affect-the-gain-of-an-SiPM.html; retrieved on Apr. 11, 2022.

"Saturation Compensation for Visible Light Communication With Off-the-Shelf Detectors"; Weijie Liu, et al.; Optics Express, vol. 29, No. 6, pp. 9670-9684; Published on Mar. 15, 2021.

* cited by examiner

602

410

0.3 m

LIGHT EMITTERS
424

LIGHT
DETECTOR(S)
426

1000

1002

Emit, by a light emitter of a light detection and ranging (lidar) device, a light signal at a first time

1004

Detect, by a light detector of the lidar device, the light signal emitted by the light emitter

1006

Modify, by a biasing circuit of the lidar device, a detector bias of the light detector using a bias signal

LIGHT DETECTORS FOR NEARBY OBJECT DETECTION IN LIGHT DETECTION AND RANGING (LIDAR) DEVICES

BACKGROUND

Unless otherwise indicated herein, the description in this section is not prior art to the claims in this application and is not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates.

Light detection and ranging (lidar) devices may estimate distances to objects in a given environment. For example, an emitter subsystem of a lidar device may emit near-infrared light pulses, which may interact with objects in the lidar device's environment. At least a portion of the light pulses may be redirected back toward the lidar device (e.g., due to reflection or scattering) and detected by a receiver subsystem. Conventional receiver subsystems may include a plurality of light detectors and a corresponding controller configured to determine an arrival time of the respective light pulses with high temporal resolution (e.g., ~400 ps). The distance between the lidar device and a given object may be determined based on a time of flight of the corresponding light pulses that interact with the given object.

The plurality of light detectors within the receiver subsystem may include photodiodes, single photon avalanche diodes (SPADs), or other types of avalanche photodiodes (APDs) to detect light that is imparted on their surfaces (e.g., by outputting an electrical signal, such as a voltage or a current, corresponding to an intensity of the light). Many types of such devices are fabricated out of semiconducting materials. In order to detect light over a substantial geometric area, multiple light detectors can be arranged into arrays (e.g., through an electrical connection in series). These arrays are sometimes referred to as silicon photomultipliers (SiPMs) or multi-pixel photon counters (MPPCs).

SUMMARY

The disclosure relates to ramping the bias of one or more light detectors (e.g., SiPMs) within a lidar device. By ramping the bias applied to the one or more light detectors, the adverse effects of internal feedback (e.g., saturation of the one or more light detectors based on internal feedback) may be mitigated. For example, when light signals are emitted by one or more light emitters within the lidar device, internal reflections from one or more components of the lidar device (e.g., a housing of the lidar device) may be detected by the one or more light detectors. Given the intensity of these reflections, in the absence of mitigation techniques, the one or more light detectors may saturate and then take time to recover. During this recovery period, additional reflection signals (e.g., from objects in the surrounding environment) may be undetectable. Hence, by ramping the bias and preventing saturation based on internal reflections, nearby objects in the surrounding environment (e.g., those objects close enough to the lidar device such that they would fall in the recovery period in the absence of mitigation techniques) may remain detectable.

In a first aspect, a light detection and ranging (lidar) device is provided. The lidar device includes a light emitter configured to emit a light signal at a first time. The lidar device also includes a light detector configured to detect the light signal emitted by the light emitter. Additionally, the lidar device includes a biasing circuit configured to modify a detector bias of the light detector using a bias signal. The bias signal ramps the detector bias from a first bias level at the first time to a second bias level at a second time. The second time occurs after the first time and is separated from the first time by a ramp duration. The second bias level is greater than the first bias level. The ramp duration is sufficient to prevent any internal feedback within the lidar device caused by the emitted light signal from saturating the light detector or detection circuitry associated with the light detector.

In a second aspect, a method is provided. The method includes emitting, by a light emitter of a light detection and ranging (lidar) device, a light signal at a first time. The method also includes detecting, by a light detector of the lidar device, the light signal emitted by the light emitter. Additionally, the method includes modifying, by a biasing circuit of the lidar device, a detector bias of the light detector using a bias signal. The bias signal ramps the detector bias from a first bias level at the first time to a second bias level at a second time. The second time occurs after the first time and is separated from the first time by a ramp duration. The second bias level is greater than the first bias level. The ramp duration is sufficient to prevent any internal feedback within the lidar device caused by the emitted light signal from saturating the light detector or detection circuitry associated with the light detector.

In a third aspect, a light detection and ranging (lidar) device is provided. The lidar device includes a plurality of light emitters. Each light emitter is configured to emit a light signal at a corresponding first time. The lidar device also includes a plurality of light detectors. Each light detector corresponds to at least one light emitter of the plurality of light emitters. Each light detector is configured to detect the light signal emitted by the light emitters to which the light detector corresponds. Additionally, the lidar device includes a biasing circuit configured to modify a detector bias for one or more light detectors of the plurality of light detectors using one or more bias signals. Each bias signal ramps the detector bias for the one or more corresponding light detectors from a corresponding first bias level at the corresponding first time to a corresponding second bias level at a corresponding second time. Each corresponding second time occurs after the corresponding first time and is separated from the corresponding first time by a corresponding ramp duration. Each second bias level is greater than the corresponding first bias level. Each ramp duration is sufficient to prevent any internal feedback within the lidar device caused by the corresponding emitted light signal from saturating the corresponding light detector or detection circuitry associated with the corresponding light detector.

These as well as other aspects, advantages, and alternatives will become apparent to those of ordinary skill in the art by reading the following detailed description, with reference, where appropriate, to the accompanying drawings.

DETAILED DESCRIPTION

Figure 1:
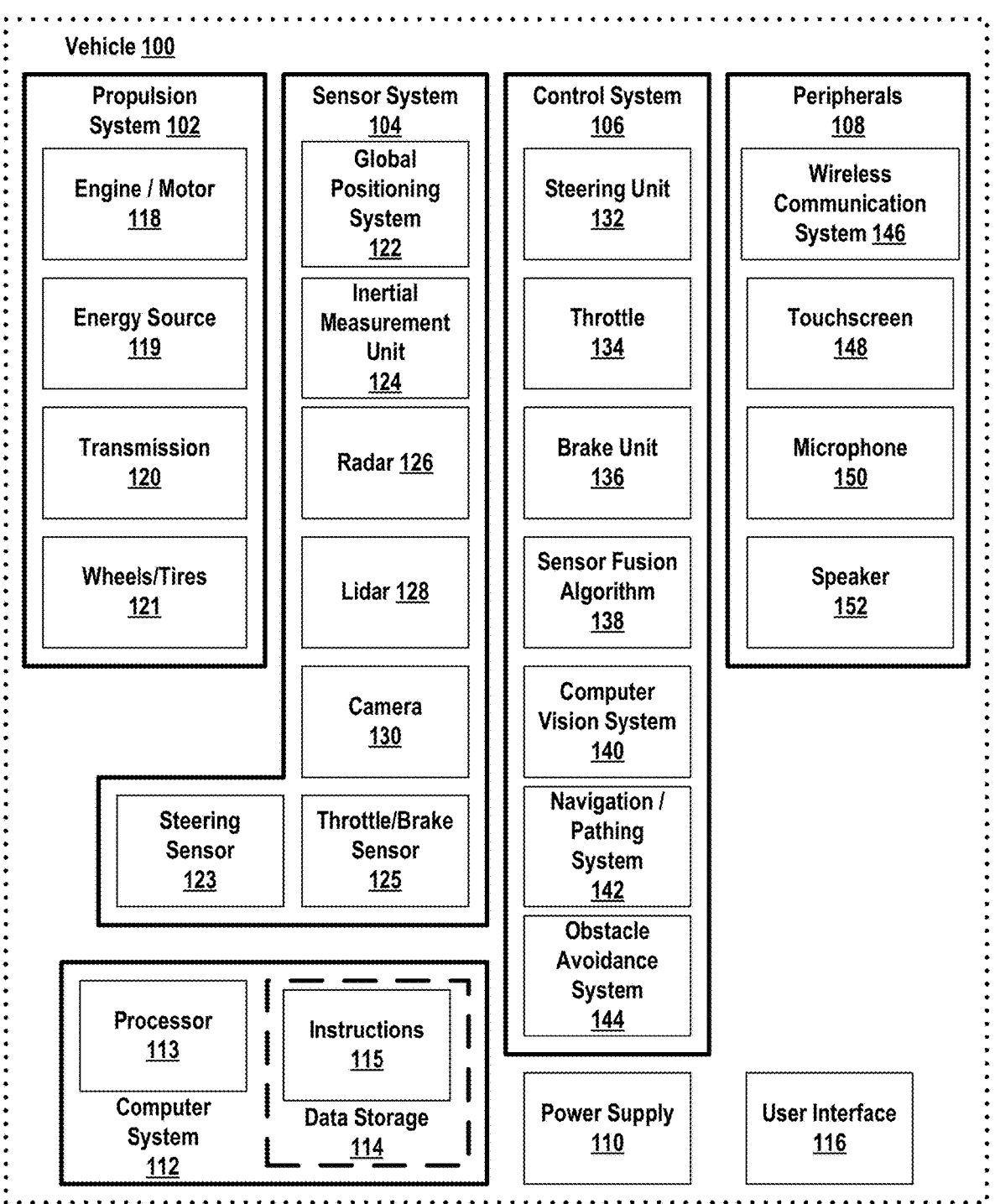
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, terrain, etc. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Lidar devices may include a number of components within the emitter subsystem and/or receive subsystem. For example, a lidar device may include one or more lenses, one or more mirrors, one or more waveguides, one or more baffles, one or more optical windows, an external housing to enclose the internal components of the lidar device, one or more power supplies, one or more controllers, one or more circuit boards, etc. As a result of these components, some lidar devices may suffer from undesirable internal reflections (i.e., resulting from a light signal emitted by a light emitter that is reflected by one or more of the components within the lidar device). Such internal reflections may be detected by the light detector. Given the distances separating the components within the lidar device (e.g., between 1.0 μm and 50.0 cm) relative to the distances from the lidar device to objects in the surrounding environment being detected by the lidar device (e.g., between 0.0 cm and 300.0 m), detections of internal reflections may occur relatively early in a detection cycle of the light detector.

Detection events relating to internal reflections within the lidar device may be ignored by the lidar device when producing a dataset (e.g., a dataset usable to generate a three-dimensional point cloud of the surrounding environment). For example, any detection event that corresponds to a distance (e.g., based on time of flight of the light signal) that is less than a threshold distance from the light emitter/light detector (e.g., less than 10.0 cm, less than 15.0 cm, less than 20.0 cm, less than 25.0 cm, less than 30.0 cm, less than 35.0 cm, less than 40.0 cm, less than 45.0 cm, less than 50.0 cm, etc.) may be considered to correspond to an internal reflection and, therefore, be ignored.

However, in addition to generating spurious detection events with relatively short transit times, the internal reflections may also temporarily inhibit a light detector's ability to detect other objects (e.g., objects in the surrounding environment that are relatively close to the lidar device). For example, in some embodiments the light detector(s) may include one or more semiconductor detectors (e.g., silicon photomultipliers (SiPMs), avalanche photodiodes (APDs), single-photon avalanche photodiodes (SPADs), charge-coupled devices (CCDs), etc.). Further, because the internal reflections may be in a substantially enclosed space and/or may occur substantially close to the light detector (e.g., within a distance insufficient for significant attenuation), the internal reflections may have a relatively high intensity. When a high-intensity signal is incident on a semiconductor detector, such a signal may result in a large output electrical signal (particularly if the semiconductor detector has a strong bias, such as a strong reverse bias, applied). In addition, as a result, the high-intensity signal may also cause the semiconductor detector to saturate. Upon saturating, a semiconductor detector may be unable to perform additional detections until it has recovered. Such a recovery process takes additional time and, therefore, can result in some objects in the surrounding environment being effectively undetectable for a period of time. For example, if a SiPM light detector saturates due to detecting an internal reflection and then takes 20 ns to recover after saturation, the SiPM may not be able to perform additional detections during those 20 ns. Such a recovery time may correspond to 3.0 m of the surrounding environment being effectively undetectable by the lidar device. In addition to or instead of saturation of the semiconductor detector, the detection circuitry (e.g., the circuitry used to receive an output from the semiconductor detector and transmit the output to a controller) can also saturate as a result of a high-intensity return signal (e.g., due to internal reflections). Like saturation of the semiconductor detector, saturation of the detection circuitry can also prevent additional detections during a recovery time associated with the detection circuitry.

Example embodiments described herein reduce or eliminate this undetectable region of the surrounding environment by preventing the light detector from saturating due to internal reflections. Such techniques may be used in monostatic lidar devices (i.e., lidar devices having one-to-one correlations between light detectors and light emitters), for example. One technique described herein includes ramping the bias applied to the light detector from the time the light signal is emitted until the time at which the light signal is no longer causing internal reflections that are detectable by the light detector. For example, the bias applied to the light detector may be ramped from a first bias level (e.g., a first bias voltage) at the time of emission of the light signal to a second bias level (e.g., a second bias voltage) once the emitted light signal has propagated far enough so as to reach an external enclosure (e.g., housing) of the lidar device. The first bias level may represent the light detector (e.g., the SiPM) operating in a linear mode (e.g., a mode having a bias below Geiger-mode biasing where a photon detection event does not result in avalanche breakdown), whereas the second bias level may represent the light detector (e.g., the SiPM) operating in a Geiger mode (e.g., a mode where a photon detection event does result in avalanche breakdown/saturation). Further, such bias levels may be applied to the light detector by a biasing circuit. Once the light signal has reached the external enclosure of the lidar device, internal reflections may no longer result in saturation. Hence, at this point, the light detector may no longer suffer adverse effects from premature saturation. Further, reflections from objects in the surrounding environment that are to be detected may have relatively low intensity (e.g., due to low reflectivity of the object). As such, it may be desirable to have avalanche breakdown occur when attempting to detect such reflections.

Ramping from the first bias level to the second bias level may be performed in various ways. For example, there may be a linear ramp from the first bias level to the second bias level. Other ramp shapes are also possible and are contemplated herein (e.g., exponential ramp shapes, quadratic ramp shapes, logarithmic ramp shapes, etc.). Further, in some embodiments, piecewise functions may be used to ramp from the first bias level to the second bias level in multiple stages. For example, the ramp may include three stages: a first stage that ramps from the first bias level to a first intermediate bias level (e.g., a level that is greater than the first bias level by 10% of the difference between the first bias level and the second bias level), a second stage that ramps from the first intermediate bias level to a second intermediate bias level (e.g., a level that is less than the second bias level by 10% of the difference between the first bias level and the second bias level), and a third stage that ramps from the second intermediate bias level to the second bias level. In such an embodiment, the three stages may have different ramp shapes (e.g., the first stage has a non-linear ramp shape, such as an exponential ramp shape; the second stage has a linear ramp shape; and the third stage has a non-linear ramp shape, such as an exponential ramp shape).

In some embodiments, the first bias level may correspond to a value that nearly represents operation in Geiger mode, while still representing operation in linear mode (e.g., 80% of the Geiger mode level, 85% of the Geiger mode level, 90% of the Geiger mode level, 95% of the Geiger mode level, 99% of the Geiger mode level, 99.9% of the Geiger mode level, etc.). In this way (e.g., given the time delay associated with biasing the light detector based on the time constant of the light detector), the biasing level may be switched from operation in linear mode to operation in Geiger mode relatively quickly (e.g., once enough time has elapsed that internal reflections would no longer result in detection events within the light detector).

Further, in some embodiments, the time at which the bias ramp reaches the second bias level (e.g., the level corresponding to operation in Geiger mode) may be set so as to correspond as nearly to the external enclosure of the lidar device as possible and/or may be set so as to correspond to a distance that is just inside or just outside of the external enclosure of the lidar device. In this way, the light detector may be able to still detect reflections from the external enclosure (e.g., an external surface of the housing) of the lidar device. Such detection events may be useful when determining the exact position in time during a detection cycle that corresponds to a distance representing the external enclosure of the lidar device. Additionally or alternatively, such detection events may be useful in identifying whether any obstructions or debris are present on the external enclosure of the lidar device (e.g., cracks in the external enclosure, water, ice, snow on the external enclosure, dust on the external enclosure, fingerprints on the external enclosure, etc.). Still further, such detection events may be useful in monitoring the operation of the lidar device (e.g., the operation of the light emitters of the light device), as such detection events can be used as a baseline upon which one emission/detection cycle can be compared to a subsequent emission/detection cycle. For example, drifts in signal-to-noise ratio (SNR) from one emission/detection cycle to another could be identified by comparing detection events relating to internal reflections. Because detecting the external enclosure of the lidar device may be beneficial, it is understood that, in some embodiments, the bias ramp may be tuned so as to permit detection of the external enclosure based on internal reflections caused by the external enclosure without causing full saturation of the light detected based on such detection.

In addition to or instead of ramping bias within a light detector (e.g., a SiPM) in order to mitigate the adverse effect of feedback signals on the ability to detect nearby objects in the surrounding environment, alternative light detector combinations may also be explored. For example, in some embodiments, a light detector element corresponding to a given light emitter may include a SiPM connected in parallel with an APD. The detection output of the SiPM and the detection output of the APD may both be directed to a controller (e.g., a controller of the lidar device). The output of the APD could be used by the controller when analyzing portions of the listening window that correspond to nearby objects (e.g., earlier portions of the listening window, such as portions that correspond to distances of less than 3.0 m) while the output of the SiPM could be used by the controller when analyzing portions of the listening window that correspond to farther away objects (e.g., later portions of the listening window, such as portions that correspond to distances of more than 3.0 m). In such embodiments, the APD may be statically biased (e.g., in a standard linear operation mode) and the SiPM may be statically biased (e.g., in a standard Geiger operation mode). Alternatively, in some embodiments, the APD may be statically biased (e.g., in a standard linear operation mode) while the SiPM may be subjected to a bias ramp (e.g., as described above).

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, tractor trailers, etc.), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lanekeeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speed-bumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
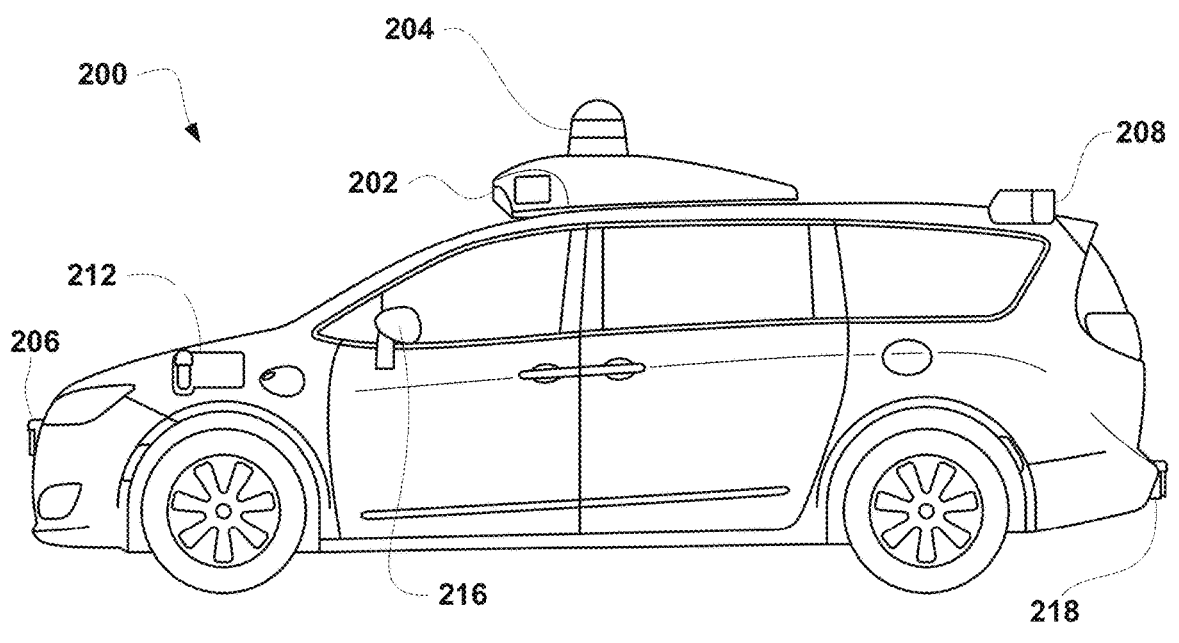
FIG. 2A is an illustration of a physical configuration of a vehicle, according to example embodiments.
Figure 2B:
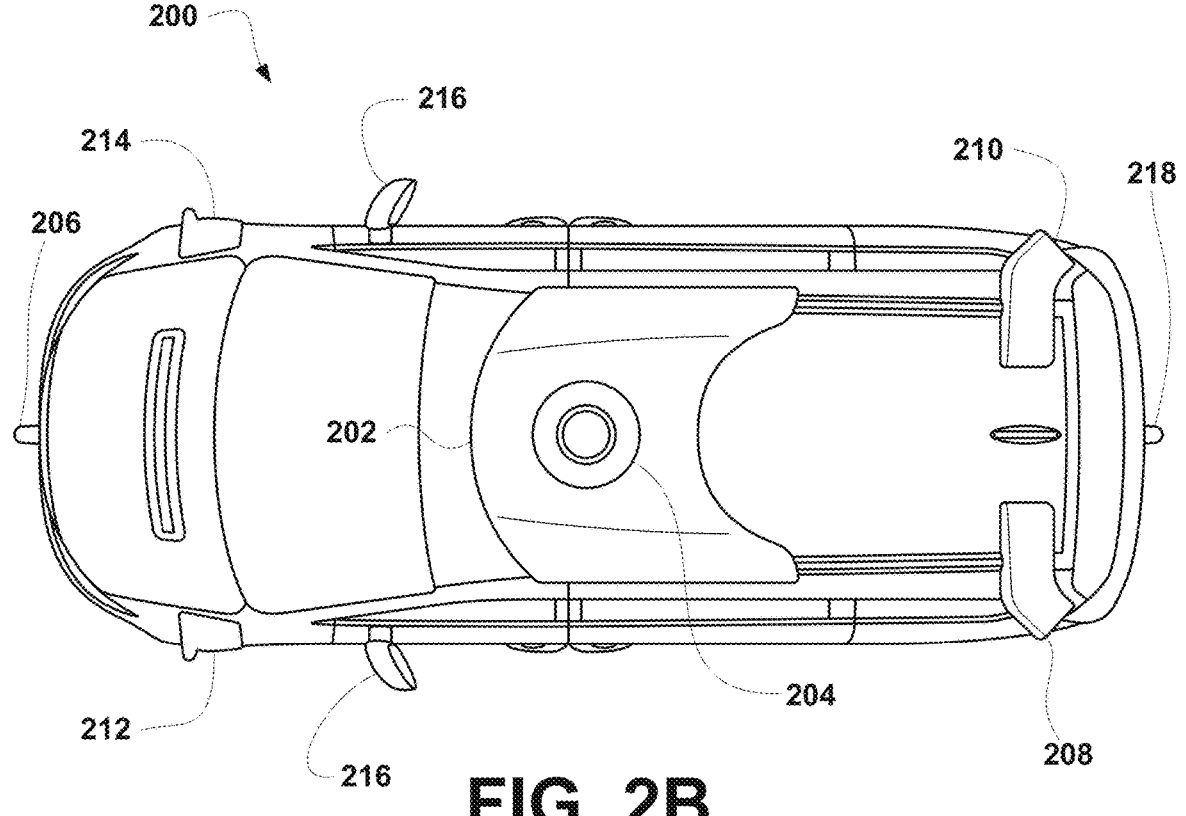
FIG. 2B is an illustration of a physical configuration of a vehicle, according to example embodiments.
Figure 2C:
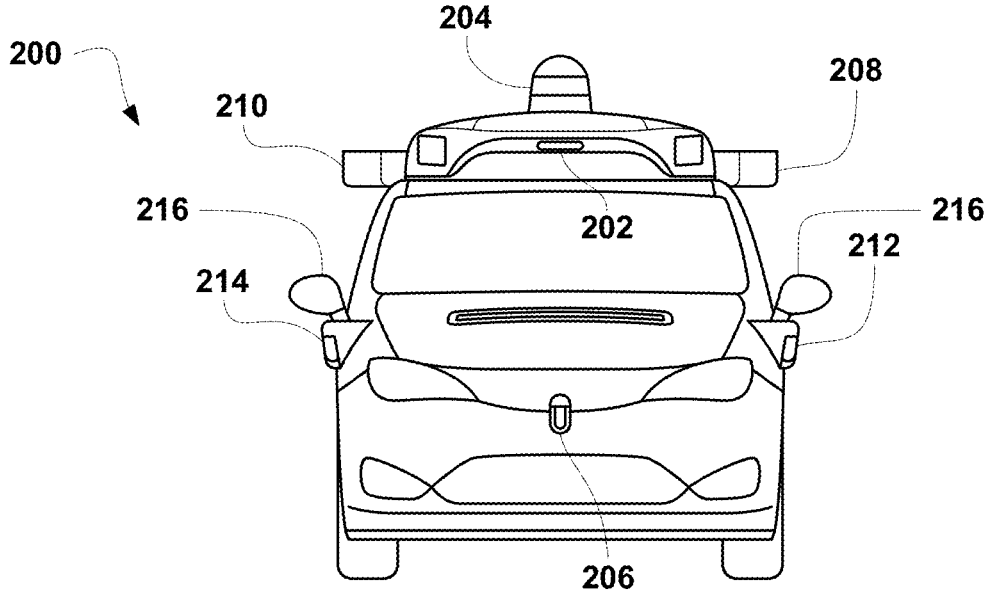
FIG. 2C is an illustration of a physical configuration of a vehicle, according to example embodiments.
Figure 2D:
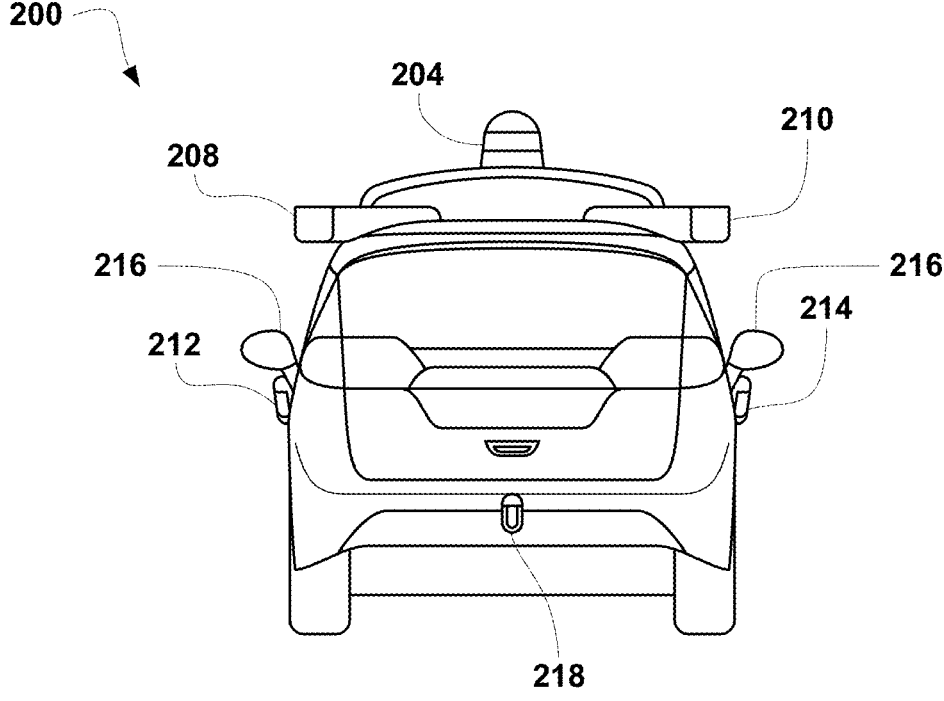
FIG. 2D is an illustration of a physical configuration of a vehicle, according to example embodiments.
Figure 2E:
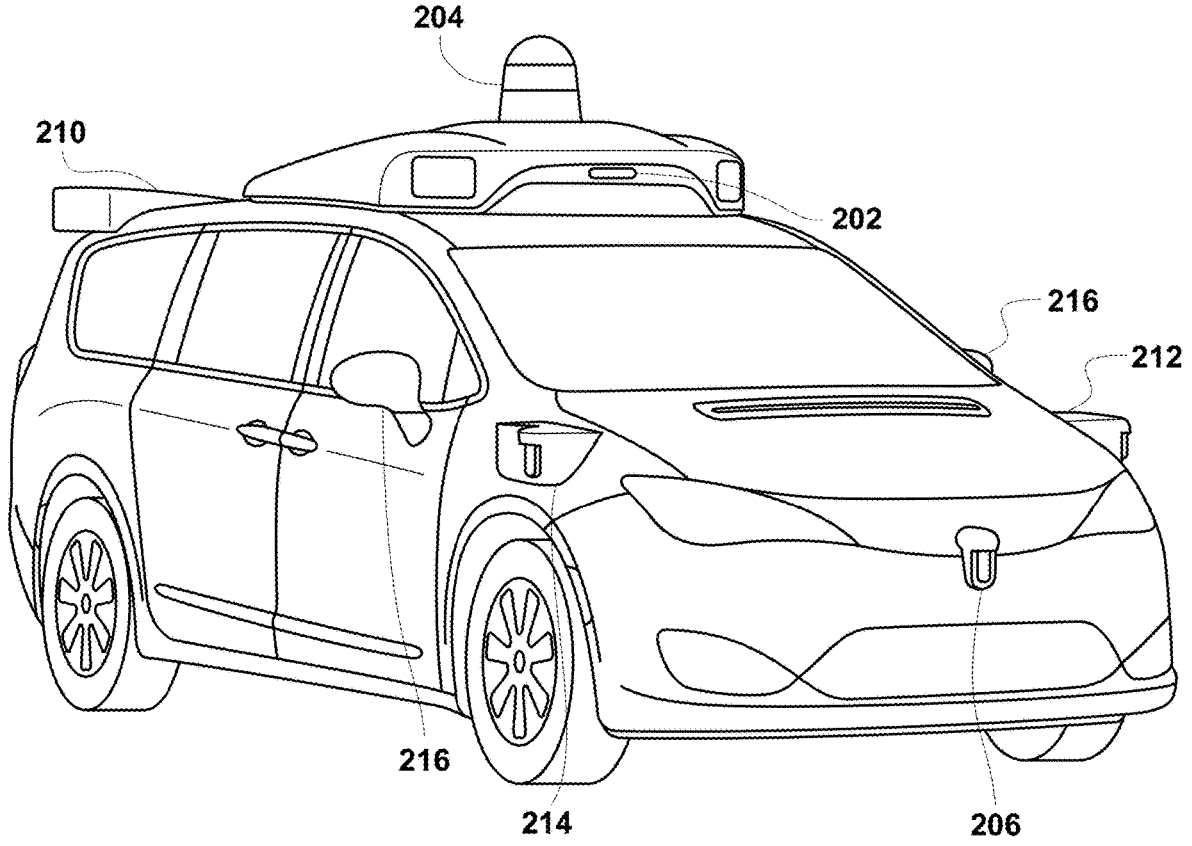
FIG. 2E is an illustration of a physical configuration of a vehicle, according to example embodiments.
Figure 2F:
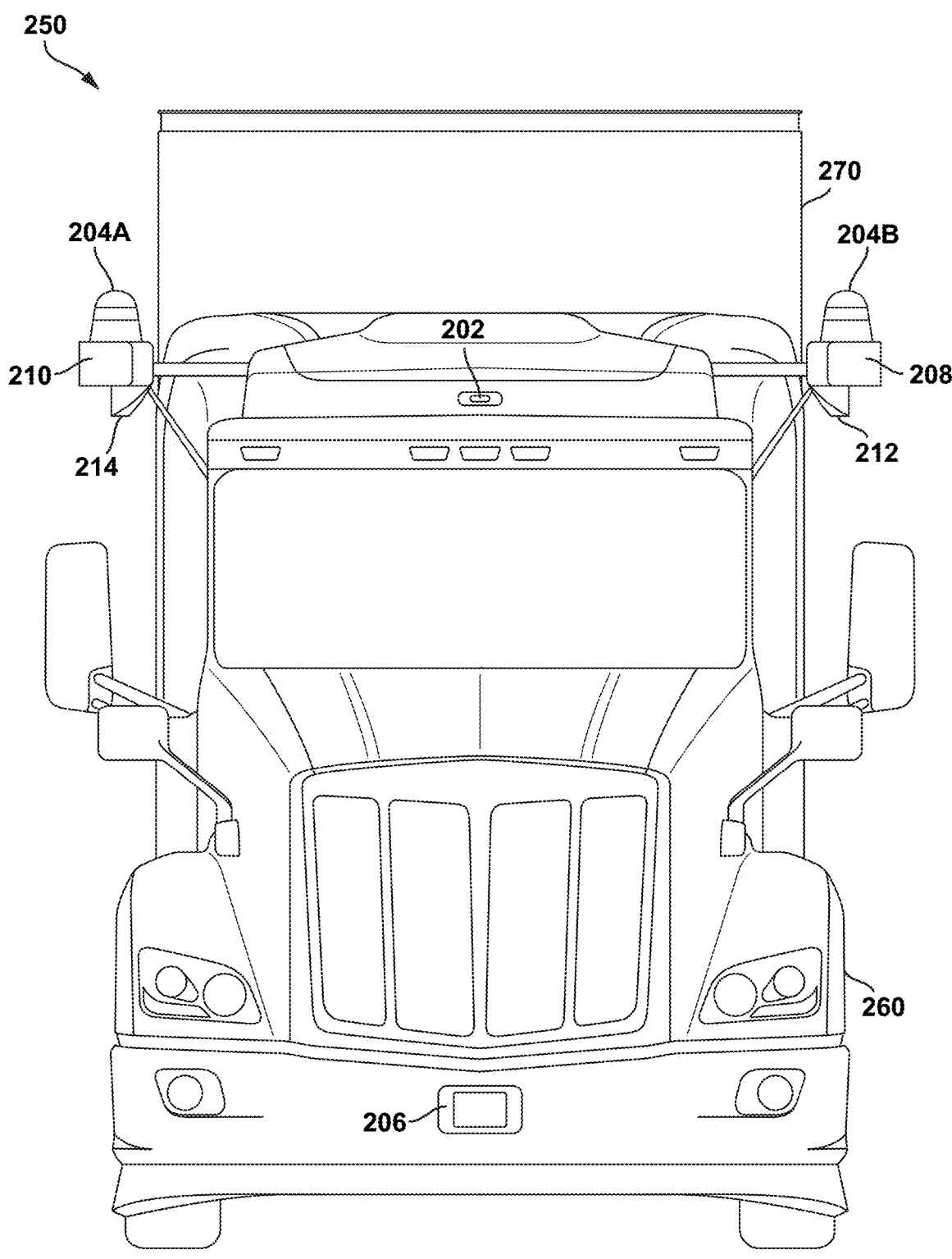
FIG. 2F is an illustration of a physical configuration of a vehicle, according to example embodiments.
Figure 2G:
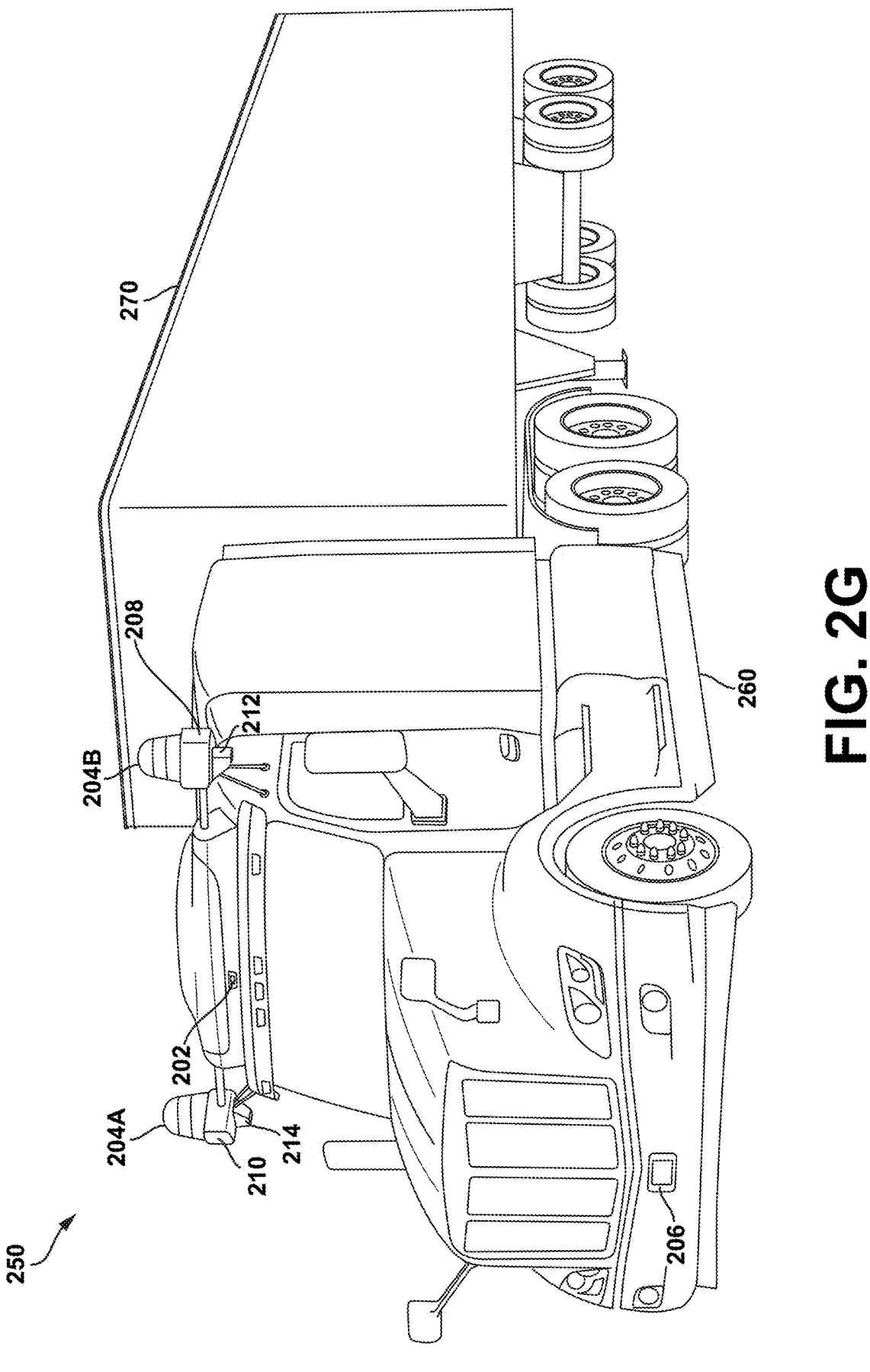
FIG. 2G is an illustration of a physical configuration of a vehicle, according to example embodiments.
Figure 2H:
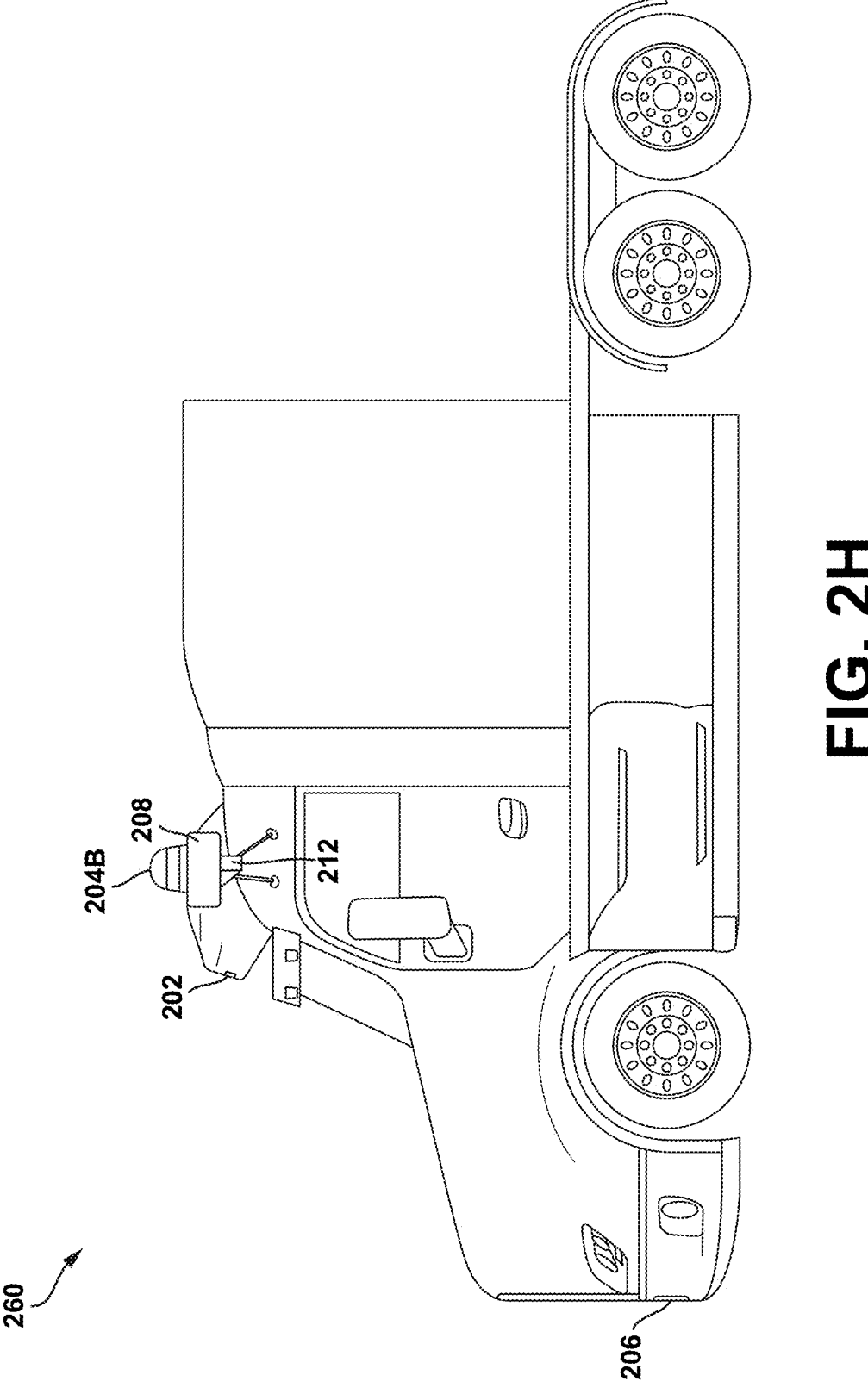
FIG. 2H is an illustration of a physical configuration of a vehicle, according to example embodiments.
Figure 2I:
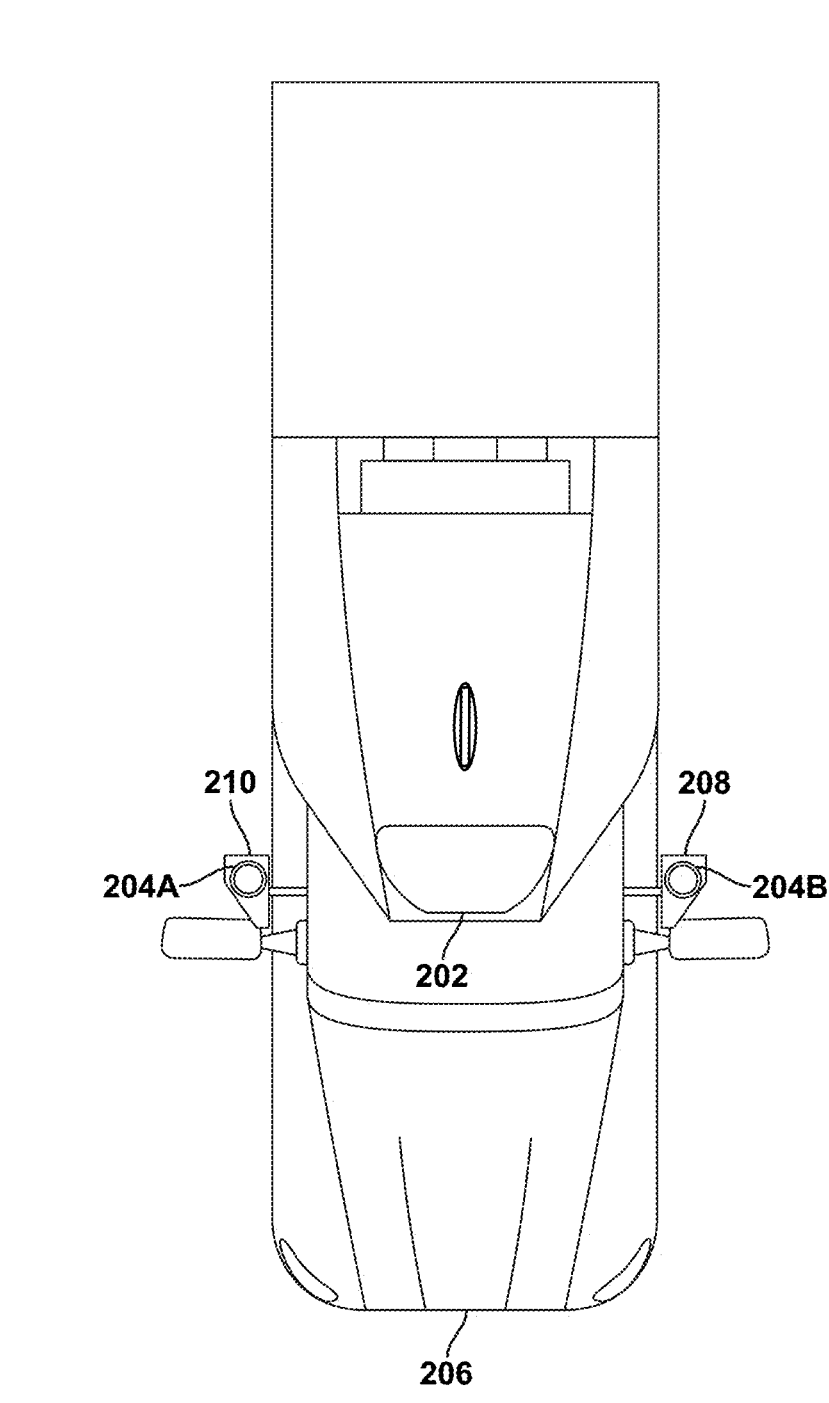
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
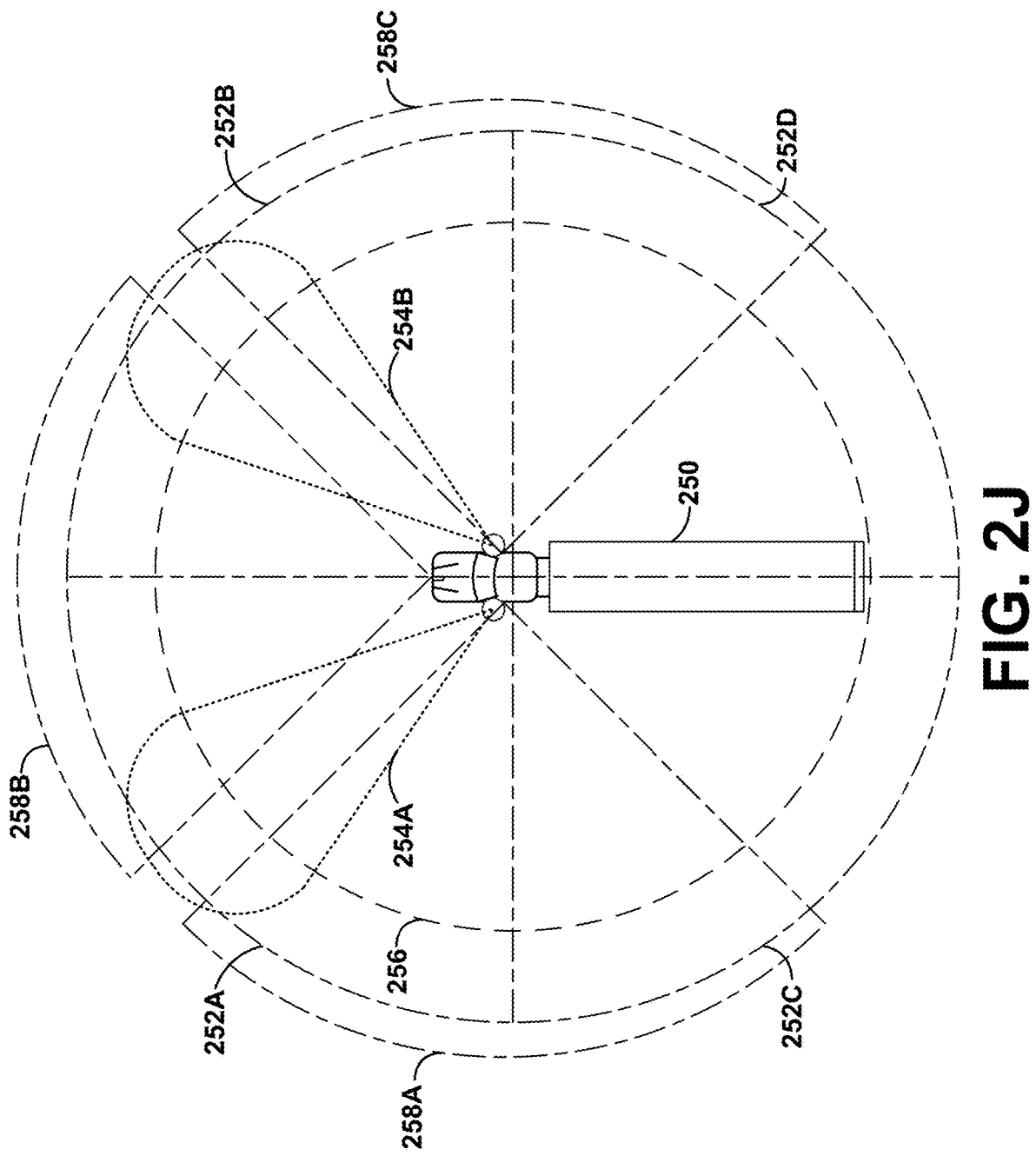
FIG. 2J is an illustration of a field of view for various sensors, according to example embodiments.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
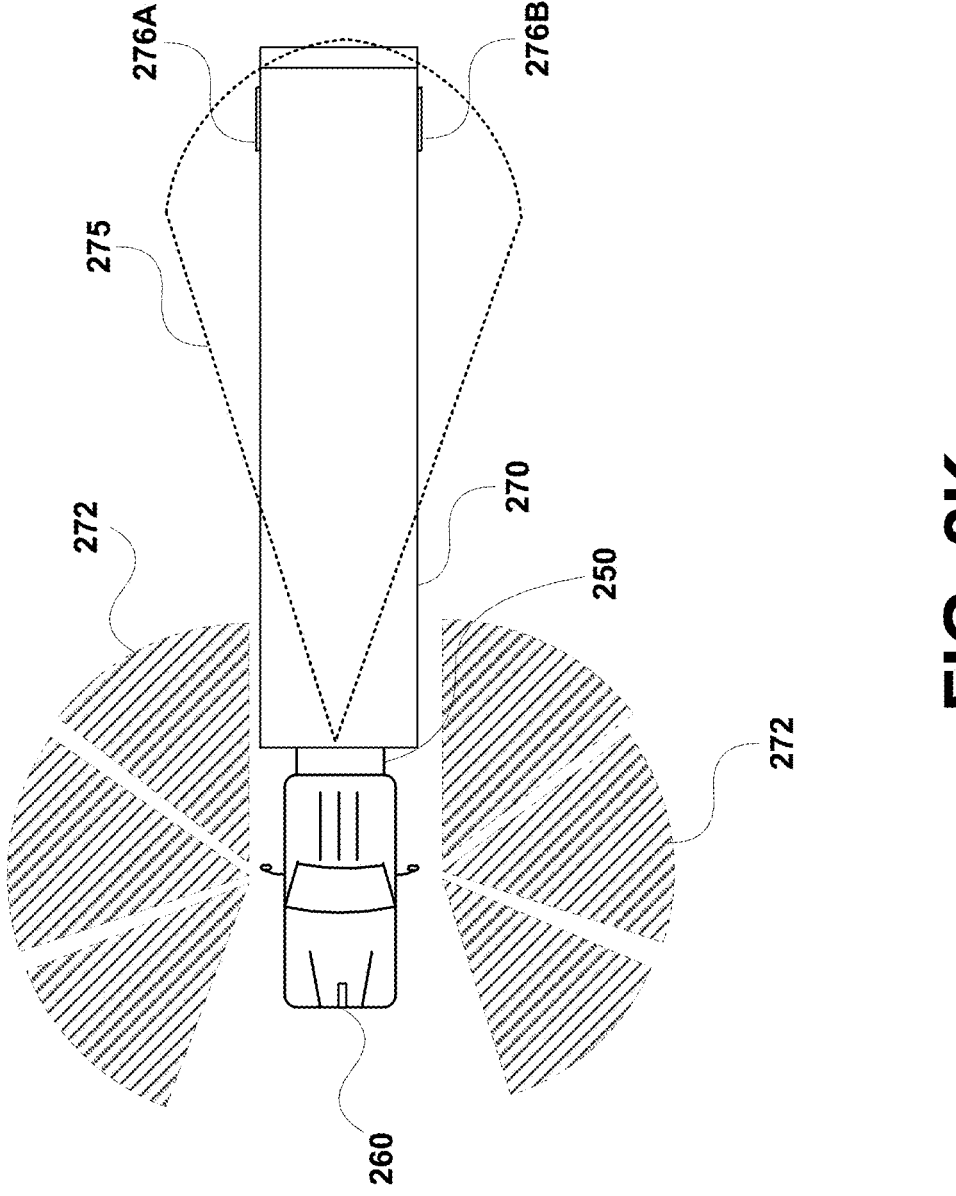
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
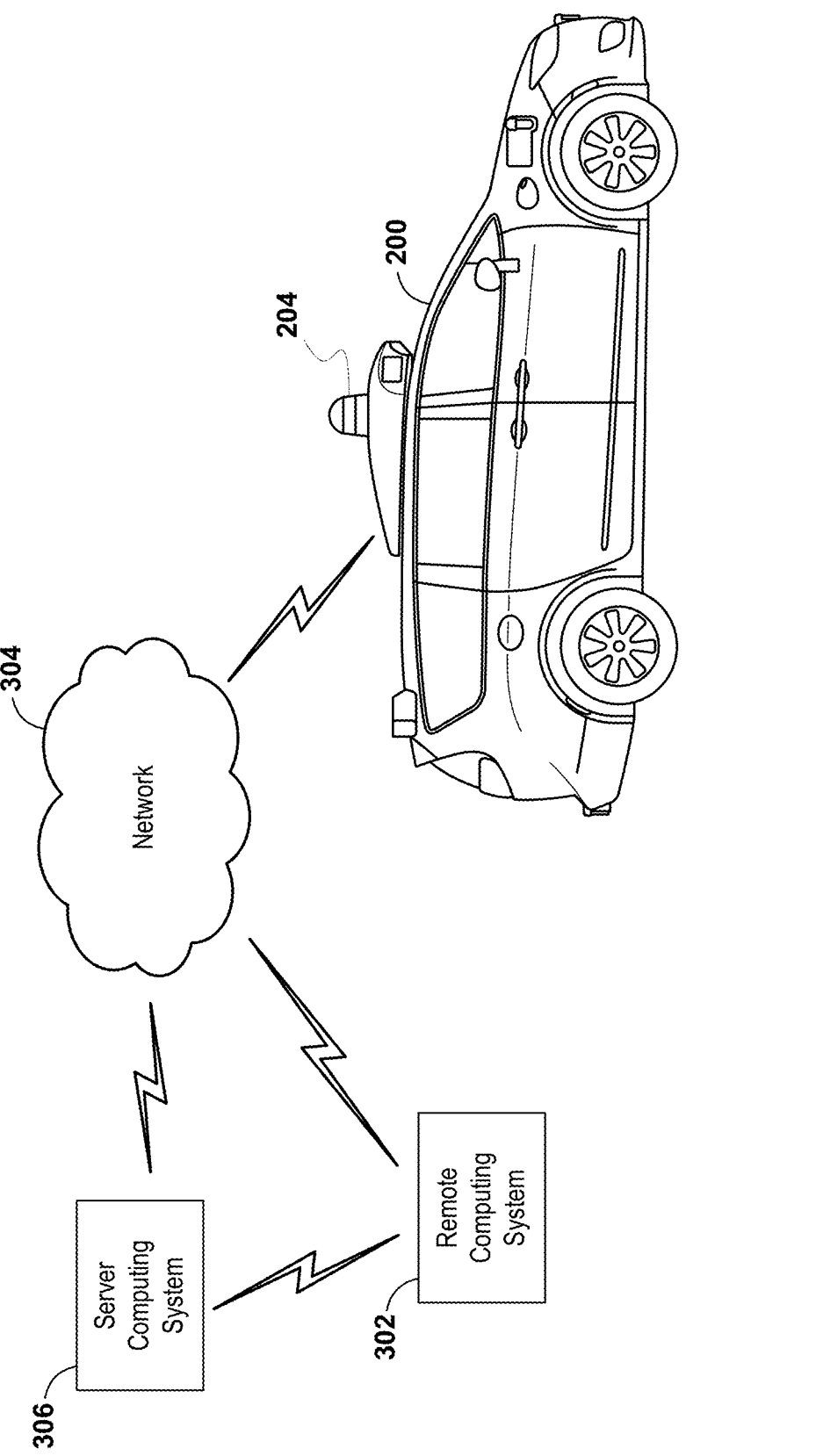
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light, etc.) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4A:
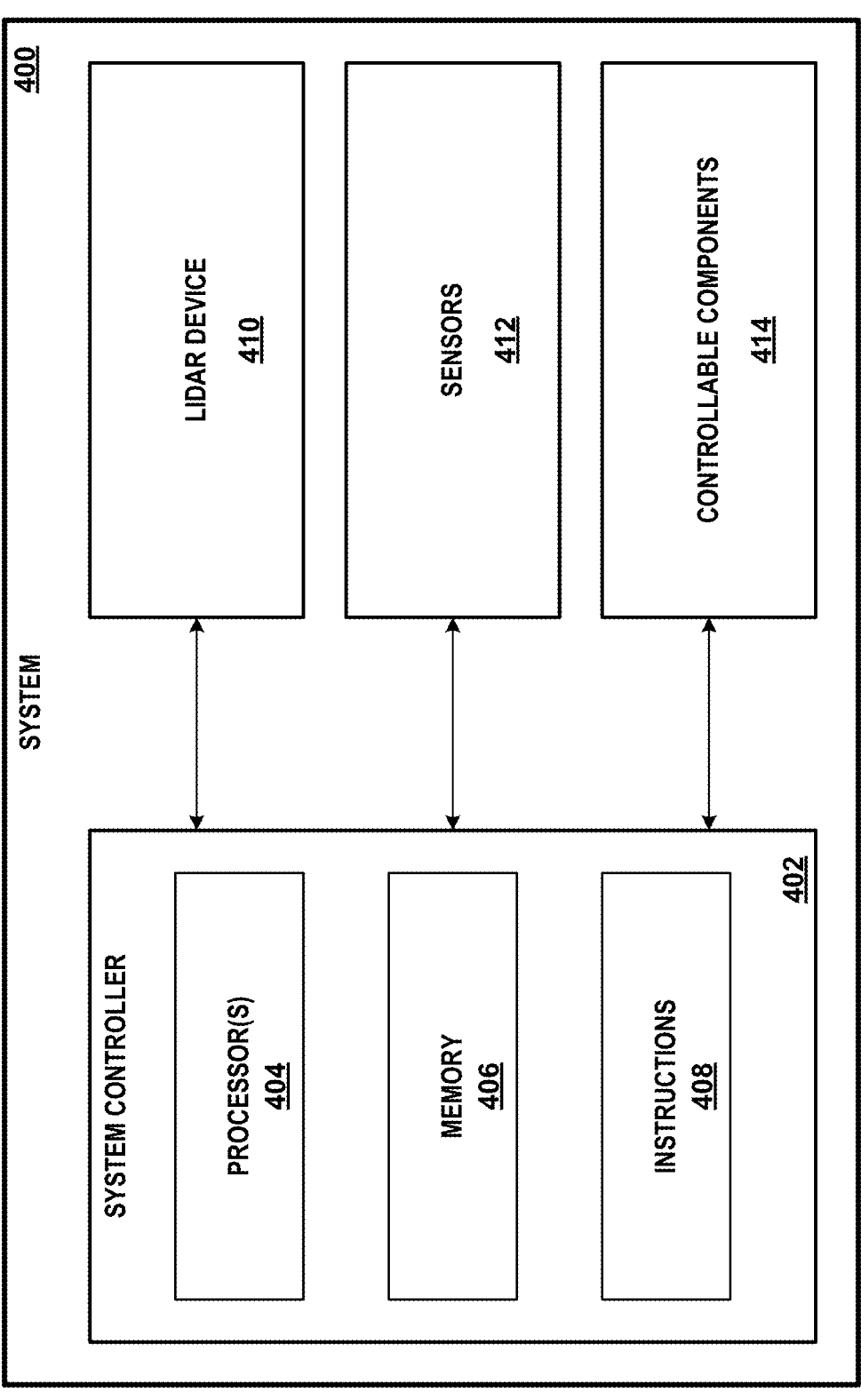
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores, etc.) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory, etc.), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses, etc.) and one or more light detectors configured to detect light (e.g., reflected portions of the light pulses, etc.). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, proximity sensing, etc.).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera, etc.), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode, etc.). Within examples, the lidar device 410 and the sensors 412 are also controllable by the system controller 402.

Figure 4B:
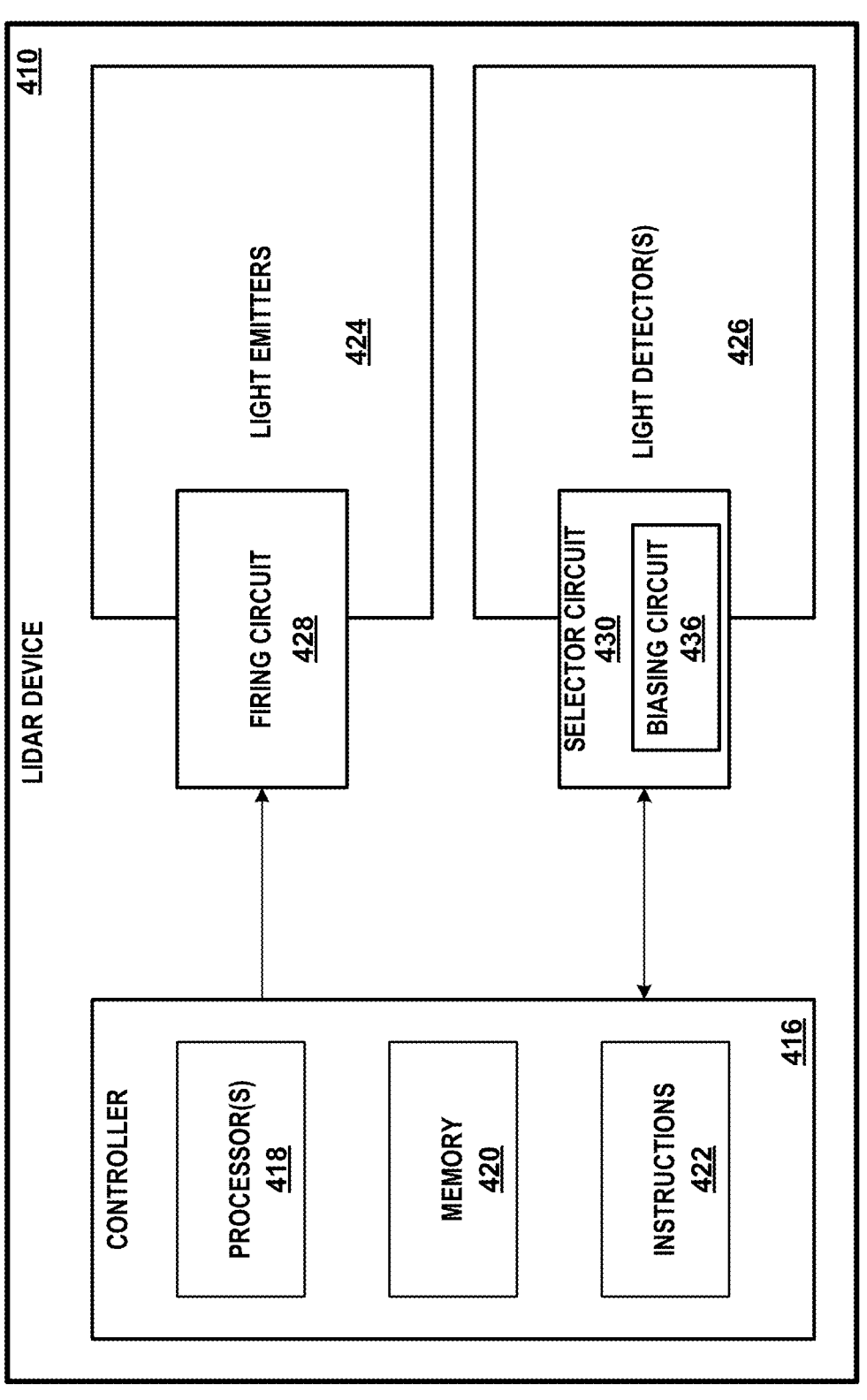
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The selector circuit 430 may incorporate a biasing circuit 436 that produces one or more bias signals used to bias the light detector(s) 426 (e.g., provide a reverse bias across one or more of the light detector(s) 426, so as to put the light detector(s) 426 in various biasing modes, such as a debiased mode, a linear mode, or a geiger mode). In alternative embodiments, the biasing circuit 436 may be separated from the selector 430 (e.g., and still controlled by the controller 416). The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory, etc.), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, etc. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system, etc.) and intensities of each reflected light pulse.

The firing circuit 428 is used for selecting light emitters for emitting light pulses. The selector circuit 430 similarly is used for sampling outputs from light detectors.

Figure 5A:
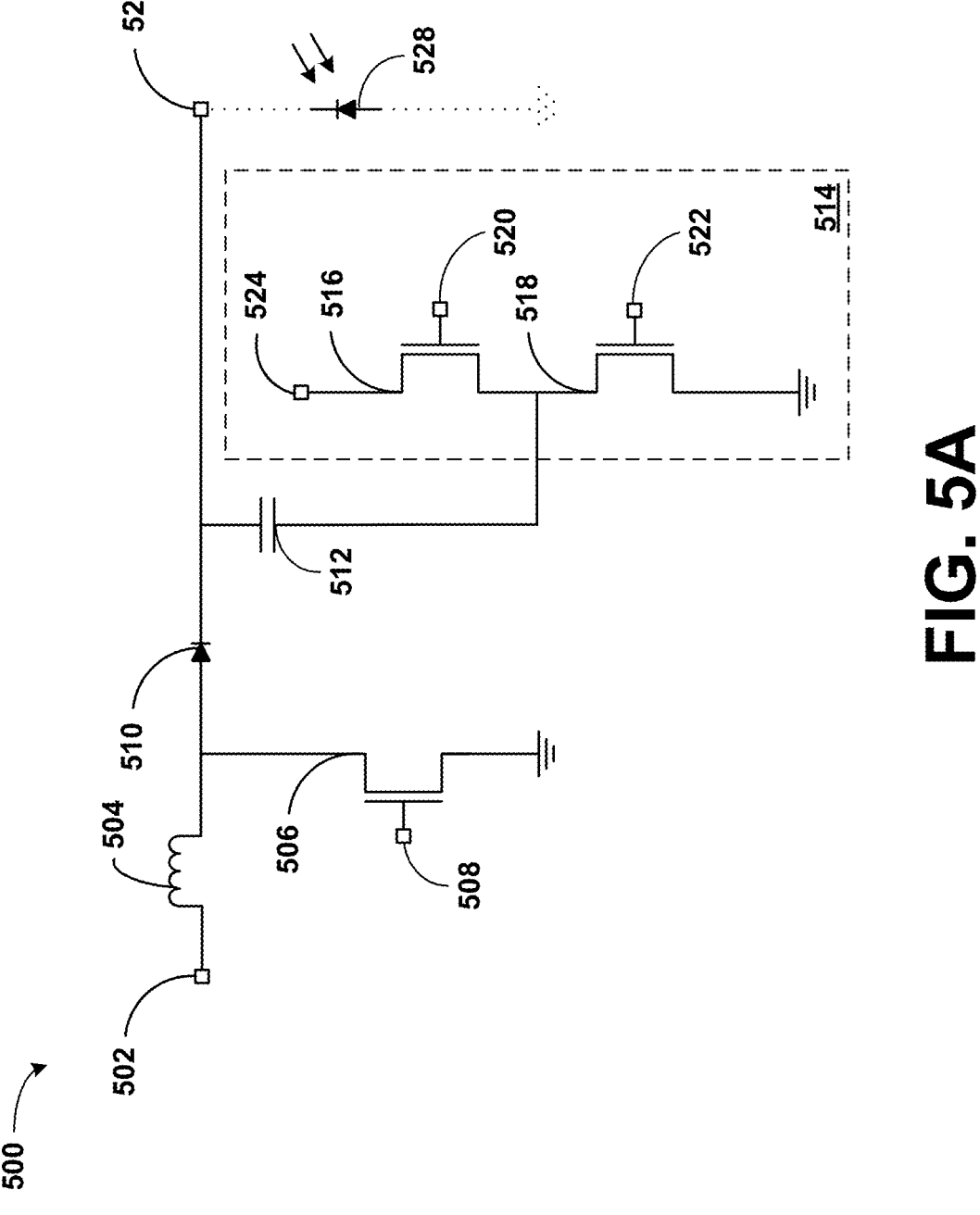
FIG. 5A illustrates a light detector biasing circuit, according to example embodiments.

FIG. 5A illustrates a light detector biasing circuit, according to example embodiments. In particular, FIG. 5A shows a circuit 500 that may have the same or similar functionality to the biasing circuit 436 shown and described in FIG. 4B. Circuit 500 includes a voltage input node 502 that may be used to provide voltage to a biasing capacitor 512 of the circuit 500. The voltage input node 502 may be connected to a larger circuit, such as a detector selector circuit (e.g., the selector circuit 430 shown and described in FIG. 4B) or be connected directly to a voltage source. Circuit 500 further includes an inductor 504 connected to the voltage input node 502 at a first terminal and connected to an anode of a diode 510 at a second terminal. The second terminal of inductor 504 and the anode of diode 510 are connected to a transistor 506 having a gate 508. A cathode of diode 510 is connected to a first terminal of capacitor 512 at an output node. The voltage input node 502, inductor 504, transistor 506, and diode 510 form a boost converter whereby controlling the transistor 506 using gate 508 at a duty cycle can charge capacitor 512 in accordance with a voltage at the voltage input node 502 and the duty cycle. Though a boost converter is depicted in FIG. 5A, other ways of charging the capacitor 512 (e.g., using a buck converter or buck-boost converter) are possible. Using voltage converters to charge capacitor 512 may allow for the capacitor 512 to be charged to a level that corresponds to a light detector using a common voltage source of the lidar device that uses a different voltage level.

The second terminal of capacitor 512 is connected to a voltage difference driver 514. The voltage difference driver 514 includes a first transistor 516 connected to a voltage source at a voltage source node 524 and a second transistor 518 connected to ground. A first gate 520 of first transistor 516 and a second gate 522 of second transistor 518 can be used to selectively drive a voltage difference (otherwise referred to herein as "Vdiff") associated with biasing a light detector. In particular, Vdiff can correspond to a non-zero voltage associated with the voltage source node 524 or may correspond to zero voltage associated with ground. In this manner, voltage difference driver 514 can be used in conjunction with a charge level of capacitor 512 to drive an output voltage (otherwise referred to herein as "Vout") at the output node 526. Transistors 516 and 518 of the voltage difference driver 514 are depicted as field-effect transistors (FETs), but other transistors or switching devices could be used.

In alternative examples, the voltage difference driver 514 might only include one transistor. For example, transistor 518 could be removed from voltage difference driver 514 or replaced with a diode. In these examples, when transistor 516 is closed, the output voltage is driven to a high level, light detector 528 is biased, and capacitor 512 can be charged. Conversely, when transistor 516 is open, light detector 528 is effectively "floating" (i.e., not connected to a conducting path associated with capacitor 512 being connected to ground or a voltage source). In this state, light detector 528 can automatically be debiased when receiving a light signal, and passively generate currents associated with the light signal (e.g., through leakage).

Thus, voltage difference driver 514 can be configured to connect the second terminal to a voltage source during a first portion of a detection period of the light detector 528. For example, this may be performed using transistor 516, a switch, or another means of connecting the second terminal to the voltage source. Connecting the second terminal to the voltage source drives the output voltage to a first voltage level above a biasing threshold of the light detector 528 and thereby biases the light detector 528.

The voltage difference driver 514 can be further configured to disconnect the second terminal from the voltage source to ground during a second portion of the detection period. For example, this may be performed using transistor 516, a switch, or another means of disconnecting the second terminal from the voltage source. Disconnecting the second terminal from the voltage source causes the output voltage to reach a second voltage below the biasing threshold of the light detector 528 and thereby debiases the light detector 528. For example, concurrently with disconnecting the second terminal from the voltage source using transistor 516, voltage difference driver 514 can use transistor 518 to connect the second terminal to ground, which drives the output voltage level to a low level corresponding to a charge level of capacitor 512. In another example, the second terminal is not connected to ground, and disconnecting the second terminal from the voltage source causes light detector 528 to automatically debias based on received light and the charge level of capacitor 512. For example, disconnecting the second terminal from the voltage source may correspond to the light detector 528 (e.g., a SiPM) not reaching a breakdown voltage. Accordingly, a relatively low leakage current corresponds to a correspondingly low voltage drop across the light detector 528, causing the light detector to be debiased or biased in a linear mode (e.g., in a regime having a bias below Geiger-mode biasing where a photon detection event does not result in avalanche breakdown), based on the specific voltage conditions.

FIG. 5A also shows a light detector 528. Though the light detector 528 is depicted as a photodiode, other types of light detectors can be used. For example, a light detector can be a photoconductor (photoresistor), photovoltaic device (photocell), phototransistor, a photodiode, metal-oxide-semiconductor (MOS) capacitor, an APD, a SPAD, a SiPM, or another device capable of producing an output indicative of an intensity of light received by the light detector. Though SiPMs are described below, it should be understood that the light detector 528 can include any of the above-listed light detectors or other types of light detectors. The light detector 528 may include SiPMs due to their relatively high sensitivity. As described herein, SiPMs may be capable of being biased in Geiger mode and may also be made of many individual SPAD elements (e.g., connected in parallel to build dynamic range). However, as also described herein, SiPMs might be prone to saturation based on the finite number of cells in the design of a given SiPM. In addition, each SPAD element of a given SiPM might be subject to sensitivity loss after being fired due to a photon detection event, since the internal charge stored in the device requires replenishment that occurs subject to the SiPM recovery time constant (e.g., between 5 ns and 30 ns, depending on the device). Further, saturation along with the finite recovery time may result in excess sensitivity loss and nonlinearity by the SiPM (e.g., when biased in Geiger mode) with regards to the ability to detect a subsequent light signal after detecting a strong reflected signal. In contrast, APDs may behave linearly over a wider dynamic range (e.g., and may also be subject to milder second-order saturation effects).

Further, within examples, the light detector 528 may be referred to as being "biased" (e.g., in various biasing modes, such as an unbiased, linear-mode biased, or Geiger-mode biased). This may include being reversed-biased, as shown in FIG. 5A. While operated in a Geiger mode, SiPMs, SPADs, and other types of sensitive photodetectors can provide single-photon-level sensing. A Geiger mode, for example, may include a strong reverse bias condition of a p-n junction in order to generate multiple carriers within a depletion region for a single photoexcitation event (e.g., through avalanche breakdown). However, because of the strong bias conditions, dark current might also arise from thermally generated minority carriers that cascade into measurable numbers of minority carriers. In addition to thermally generated minority carriers, some minority carriers may be photoexcited in a substrate of a device by photons that pass unabsorbed through the junction and are absorbed in the substrate. "Dark current" may occur when a photodetector is outputting a signal, even after a light source is no longer irradiating the photodetector. This may alternatively and interchangeably be referred to herein as "spurious current," "spurious output signals," "dark counts," or "an extended time decay constant associated with a detection event."

Additionally, light detector 528 is depicted with dotted lines to signify that, depending on context, it may or may not be considered a part of circuit 500. For example, the light detector 528 may be thought of as being contained within circuit 500, or as being a separate element coupled to an output of circuit 500.

Figure 7:
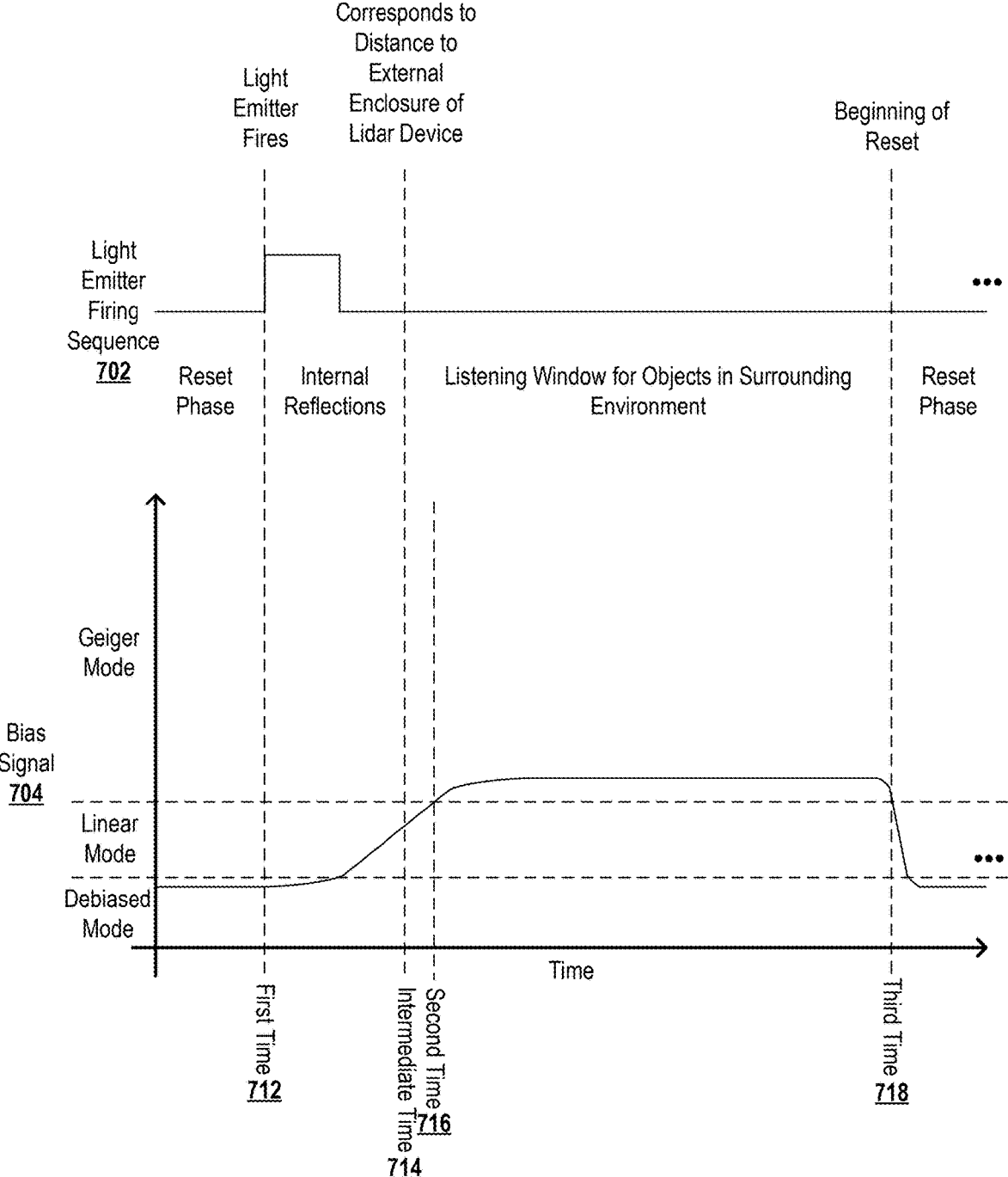
FIG. 7 is an illustration of a firing sequence and a bias signal, according to example embodiments.
Figures 8A, 8B, 8C:
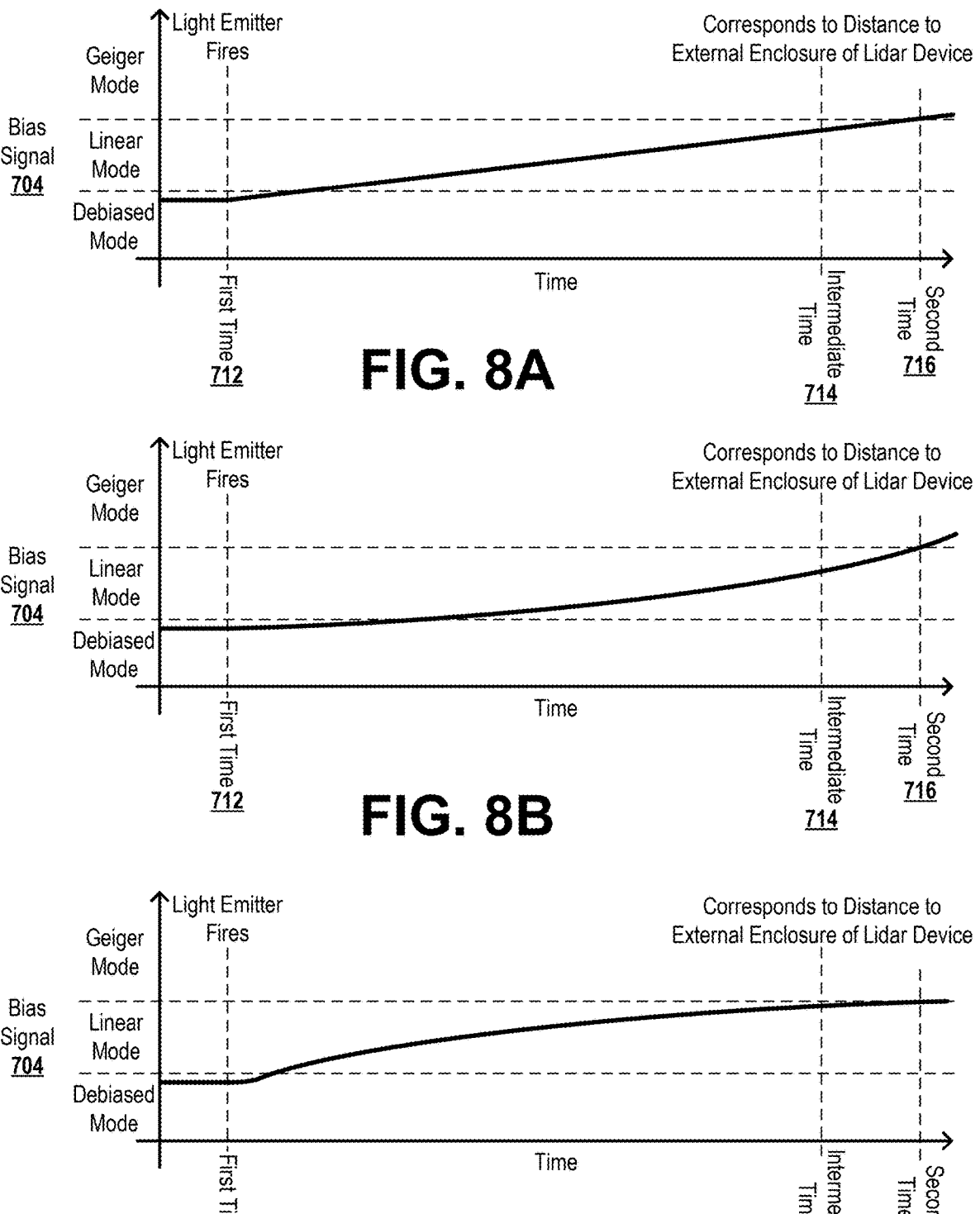
FIG. 8A is an illustration of a bias signal, according to example embodiments.
FIG. 8B is an illustration of a bias signal, according to example embodiments.
FIG. 8C is an illustration of a bias signal, according to example embodiments.

A light detector, such as a SiPM, can generate current in response to receiving light. For example, a SiPM generates a current in response to receiving a single photon when the SiPM is reverse-biased with a voltage that is above its breakdown voltage (e.g., the SiPM is biased in a Geiger mode). For example, this biasing voltage could be about 50 V, and correspond to an output voltage at the output node 526 driven by the capacitor 512 and voltage difference driver 514. In a device (e.g., the lidar device 410 shown and described relative to FIG. 4B) that includes many SiPMs, biasing the SiPMs continuously may consume a substantial amount of power. To use power more efficiently, the SiPMs can be biased only at certain selected times (e.g., using the biasing circuit 436). For example, in the lidar device 410, a SiPM (e.g., one of the light detector(s) 426) may be biased during two separate periods of time relative to when a light emitter 424 (e.g., a laser diode) corresponding to the SiPM is fired: a first period of time (e.g., 1 microsecond) before the laser diode is fired, in order to obtain a background measurement; and a second period of time (e.g., 2 microseconds) after the laser diode is fired that serves as a listening period within which the SiPM can detect a return pulse. During other periods of time, the SiPM is debiased. In this manner, power can be conserved during the debiasing period. In further examples, the first period of time and the second period of time in which the SiPM is biased may be generically referred to as a first timeframe and a second timeframe of a first portion of a pulse period associated with a light emitter, and the other periods of time in which the SiPM is debiased may be referred to a second portion of the pulse period. Other biasing schemes are also possible and contemplated herein. For example, FIGS. 7-8C illustrate potential biasing schemes used to mitigate adverse effects resulting from internal feedback (e.g., to prevent saturation of the SiPM based on internal reflections within the lidar device).

To achieve selective biasing and debiasing of a SiPM, the circuit 500 is configured to apply an output voltage (Vout) to the SiPM at output node 526. In some embodiments, this output voltage is adjustable (e.g., between two discrete voltages or among a continuum of voltages). For example, the output voltage may be adjusted between a high level (e.g., about 50 V) that is sufficient to bias the SiPM (e.g., bias the SiPM in a Geiger mode or a linear/APD mode) and a low level (e.g., 0 V) that is too low to bias the SiPM (e.g., the SiPM remains unbiased and will, therefore, not produce any current based on an incident light signal). Further, Vdiff can be less than half of a biasing voltage of the light detector 528. For example, capacitor 512 can be charged to 40 V using the boost converter, and the voltage difference driver 514 may supply an additional 10 V or 0 V depending on which gates are selected by applying a control voltage to either gate 520 or 522. In this way, control voltages applied to the gates of the FETs shown in FIG. 5A can be used to control whether Vout is at a higher level (e.g., corresponding to a Geiger-mode bias setting, such as 50 V, for the SiPM) or at a lower level (e.g., corresponding to a linear-mode/APD-mode bias setting, such as 40 V, for the SiPM). Specifically, when the first transistor 516 is on and the second transistor 518 is off, the second terminal of capacitor 512 is connected to the voltage source and Vout is at a higher level. Conversely, when the first transistor 516 is off and the second transistor 518 is on, the second terminal of capacitor 512 is connected to ground and Vout is at a lower level.

In some embodiments, the voltage source used to set the voltage of the voltage source node 524 may be modulated (e.g., to provide a continuum of potential voltage values for the voltage source node 524 and, correspondingly, for the output node 526). Additionally or alternatively, in some embodiments, the voltage difference driver 514 may include additional circuitry to provide a continuum of voltages connected to the second terminal of capacitor 512. For example, rather than two transistors 516, 518 connected to two different voltages (e.g., 10 V or 0 V), a larger number of transistors (e.g., three transistors, four transistors, five transistors, etc.) may be connected to a corresponding larger number of different voltages (e.g., three different voltages, four different voltages, five different voltages, etc.) in order to provide additional discrete voltage options for Vout. Further, techniques by which the voltage difference driver 514 provides a continuous range of voltage options (e.g., for connecting to the second terminal of the capacitor 512) are also contemplated herein. Such a continuous range of voltage options may be controlled by a corresponding controller of the lidar device (e.g., the controller 416 shown and described with reference to FIG. 4B) in order to result provide for a voltage ramp (e.g., a ramp up or ramp down) for the output node 526 (e.g., thereby resulting in a bias ramp for the light detector 528).

Figure 5B:
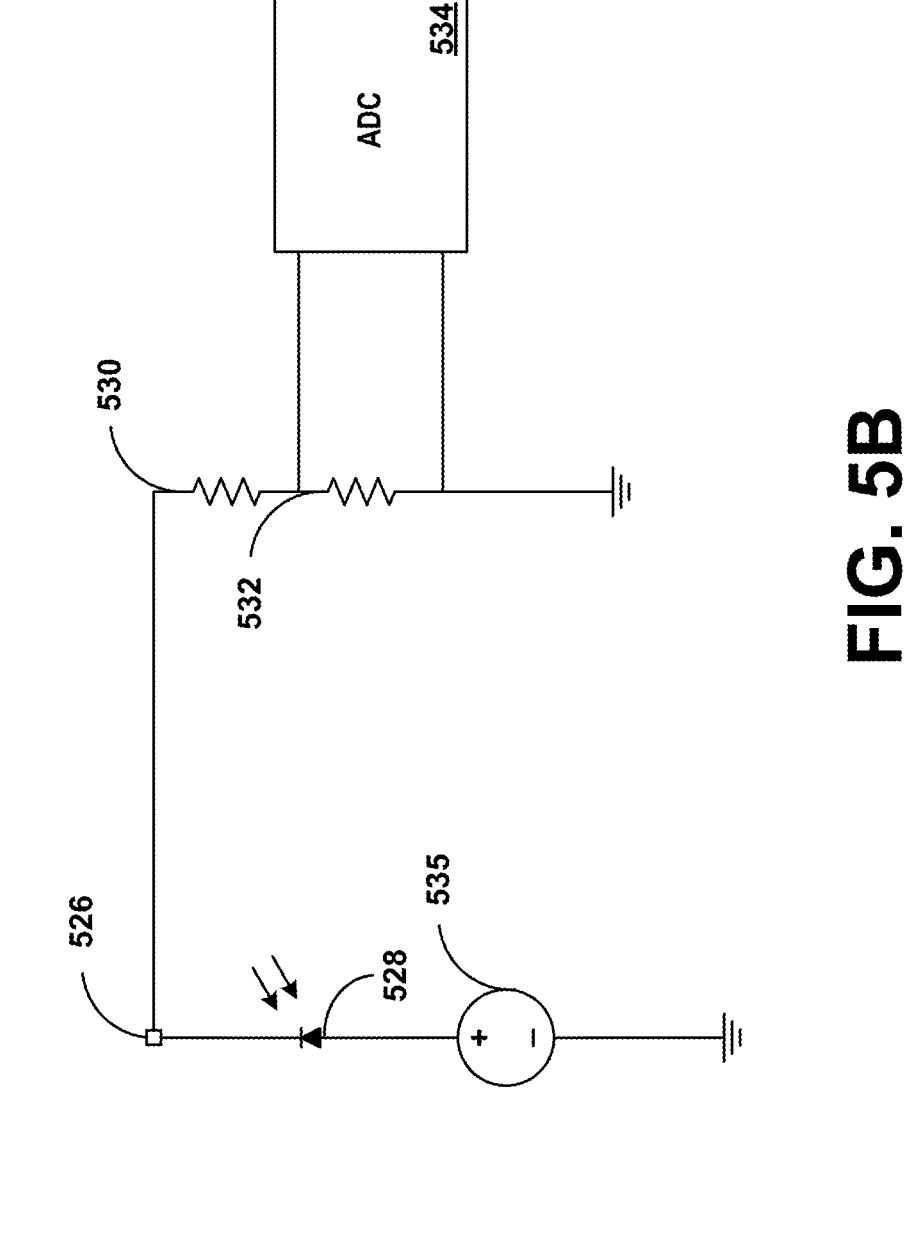
FIG. 5B illustrates a light detector sampling circuit, according to example embodiments.

FIG. 5B illustrates a light detector sampling circuit 550, according to example embodiments. In particular, FIG. 5B shows an extension of circuit 500 coupled to the output node 526. A cathode of light detector 528 is connected to output node 526 and an anode of light detector 528 is connected to a voltage source 535, which in turn is connected to ground. It should be understood that voltage source 535 is provided for illustrative purposes, and might not be present in the light detector sampling circuit 550. When light detector 528 is biased based on Vout being above a biasing threshold (e.g., above a Geiger-mode threshold or above a linear-mode/APD-mode threshold), light detector 528 drives a current through output node 526.

Conceptually, voltage source 535 can be understood as being a negative voltage when light detector 528 is biased (e.g., −50V) and at or near 0V when light detector 528 is debiased. For example, when light detector 528 is debiased, voltage source 535 can be understood to be at a relatively low voltage (e.g., less than 1V) attributable to a leakage current from light detector 528. The current can be proportional to an intensity of light received by light detector 528. The light detector sampling circuit 550 may also include a voltage divider that includes a first resistor 530 and a second resistor 532. Detecting the level of light received by light detector 528 may include sampling a voltage drop at second resistor 532 using an analog-to-digital converter (ADC) 534. In particular, when light detector 528 is biased (e.g., in a Geiger mode or in a linear mode/APD mode) and receives light, the light detector 528 drives a current and capacitor 512 discharges. For example, this may occur during a listening period of the circuit 500. ADC 534 samples the voltage level at the second resistor 532 before and after the capacitor 512 discharges (e.g., at the beginning of the listening period and at the end of the listening period). Thus, the current driven by the light detector 528 can be determined as being equal to or proportional to a capacitance (C) of capacitor 512 multiplied by a difference in voltage (V2−V1) between samples and divided by the time difference (t2−t1) between samples (I=C*(V2−V1)/(t2−t1)).1 An ADC 534 is used for measuring the voltage drop across the second resistor 532. In turn, the controller 416 may interpret values sampled by the ADC 534 to determine an intensity of light received by light detector 528. In implementations in which a SiPM is used as the light detector 528, a number of photons received by the SiPM can be determined. This may also be possible with other types of light detectors as well.

Figure 5C:
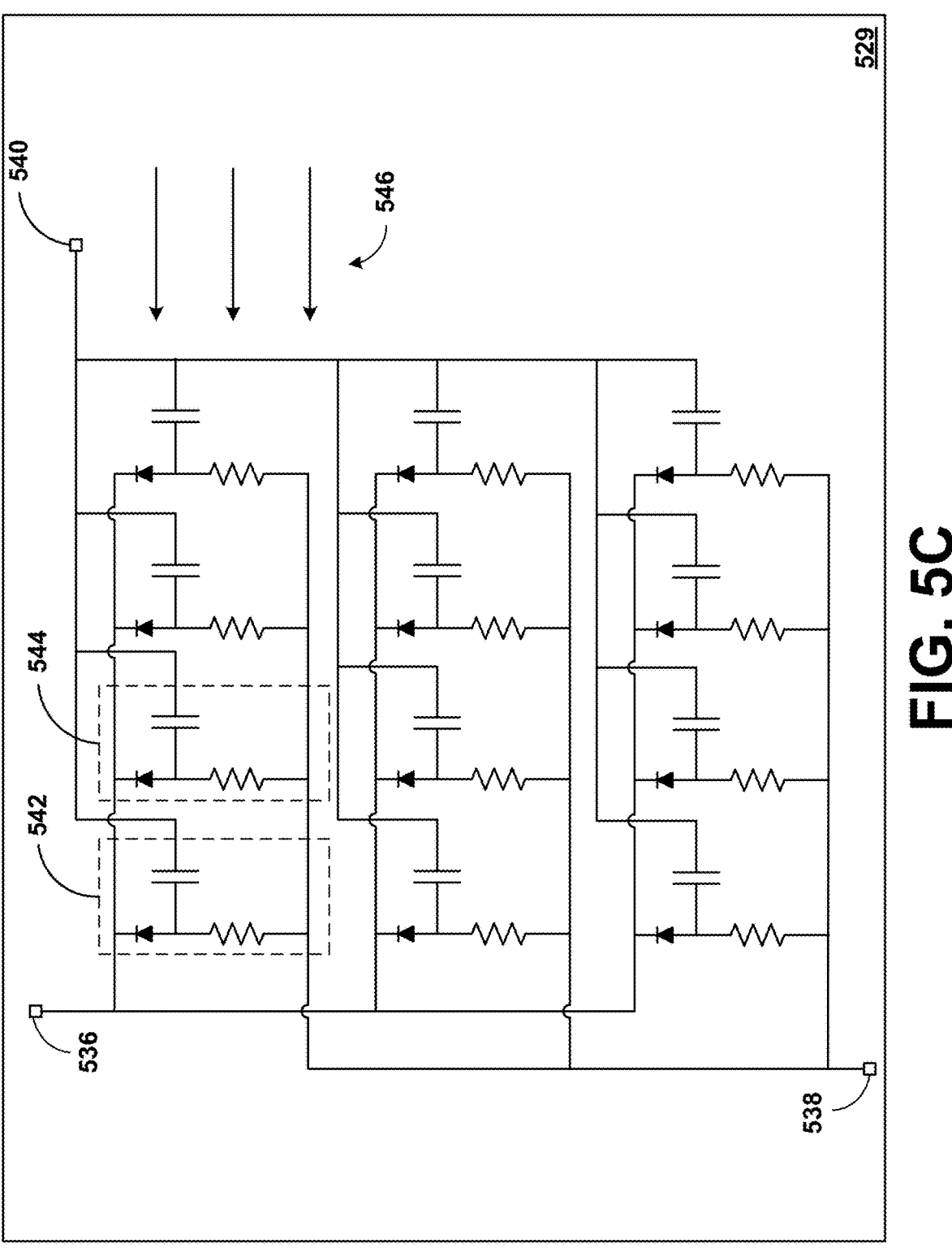
FIG. 5C illustrates a SiPM, according to example embodiments.

FIG. 5C illustrates an example SiPM 529, according to an example embodiment. In particular, FIG. 5C shows a simplified circuit representation of a SiPM. For purposes of example, SiPM 529 may operate as described above with respect to light detector 528. SiPM 529 may include a cathode 536, an anode 538, and a fast output 540. For purposes of continuity, it should be understood that the cathode 536 could connect to the output node 526, and the fast output 540 could effectively continue the output node 526 and drive a current towards other elements of corresponding circuitry, such as the voltage divider shown in FIG. 5B. The SiPM 529 includes an array of microcells including a first microcell 542 and a second microcell 544. Each microcell is configured to detect light, such as incident light 546. When any of the microcells receives a photon, a current is driven via the fast output 540. This current may be proportional to the amount of incident light 546 received by the plurality of microcells, and the resulting current can be used to determine how many photons are received by SiPM 529.

Biasing and debiasing SiPM 529 can be performed in accordance with a regular cycle. For example, a known pulse period may be associated with a light emitter (e.g., a laser diode) emitting light, and biasing and debiasing SiPM 529 may be performed in accordance with the known pulse period. In this manner, the corresponding circuit may operate in cohesion with other circuitry configured for emitting light from one or more laser diodes. In some embodiments, the biasing and debiasing of SiPM 529 may be performed using a bias signal (e.g., provided by a biasing circuit, such as the biasing circuit 436 shown and described relative to FIG. 4B).

Using the SiPM 529 to detect individual photons can occur during a listening period that has a defined duration (e.g., 2 microseconds) after the light emitter (e.g., a laser diode) is fired (i.e., emits a light signal). A light pulse is detected when a sampled photon count exceeds a threshold. For example, the threshold count (e.g., 100 photons) may be determined based on a current level driven by SiPM 529 while operationally biased or by a corresponding voltage level resulting from the current.

In some embodiments, a threshold count can be determined dynamically for each listening period. For example, each light detector can measure a background noise level during a background measurement period of defined duration (e.g., 1 microsecond) before a corresponding light emitter emits a light signal. The threshold used in the listening period of each particular light detector can be based on the background noise level that is measured during the background measurement period of that particular light detector. This threshold may correspond to a voltage level detected during the background measurement period. For example, four photons might be detected during a first timeframe based on a voltage level detected during the first timeframe and the threshold count for detecting a light pulse can be adjusted to 104 photons during the second timeframe. In this manner, reflected light pulses are detected based on a light level in the environment determined during the first timeframe and detection operations are carried out. In other implementations, a number of photons might not be explicitly determined, but detection of reflected light pulses is rather based on an output signal (e.g., an output voltage and/or current level sampled over time) of SiPM 529. For example, a matched filter that correlates an expected signal to an output signal of SiPM 529 (or, for example, light detector 528) could be applied to determine whether a reflected portion of a light pulse has been received by SiPM 529.

It is understood that the circuitries of FIGS. 5A–5C are provided solely as examples and that other detection circuitry is also possible and contemplated herein. For example, alternative circuitry could be used to generate a bias for the light detector 528 (e.g., using a bias signal). Additionally or alternatively, different circuitry could be used to detect an output signal from the light detector 528 that was generated by the light detector 528 based on incoming light.

Figure 6A:
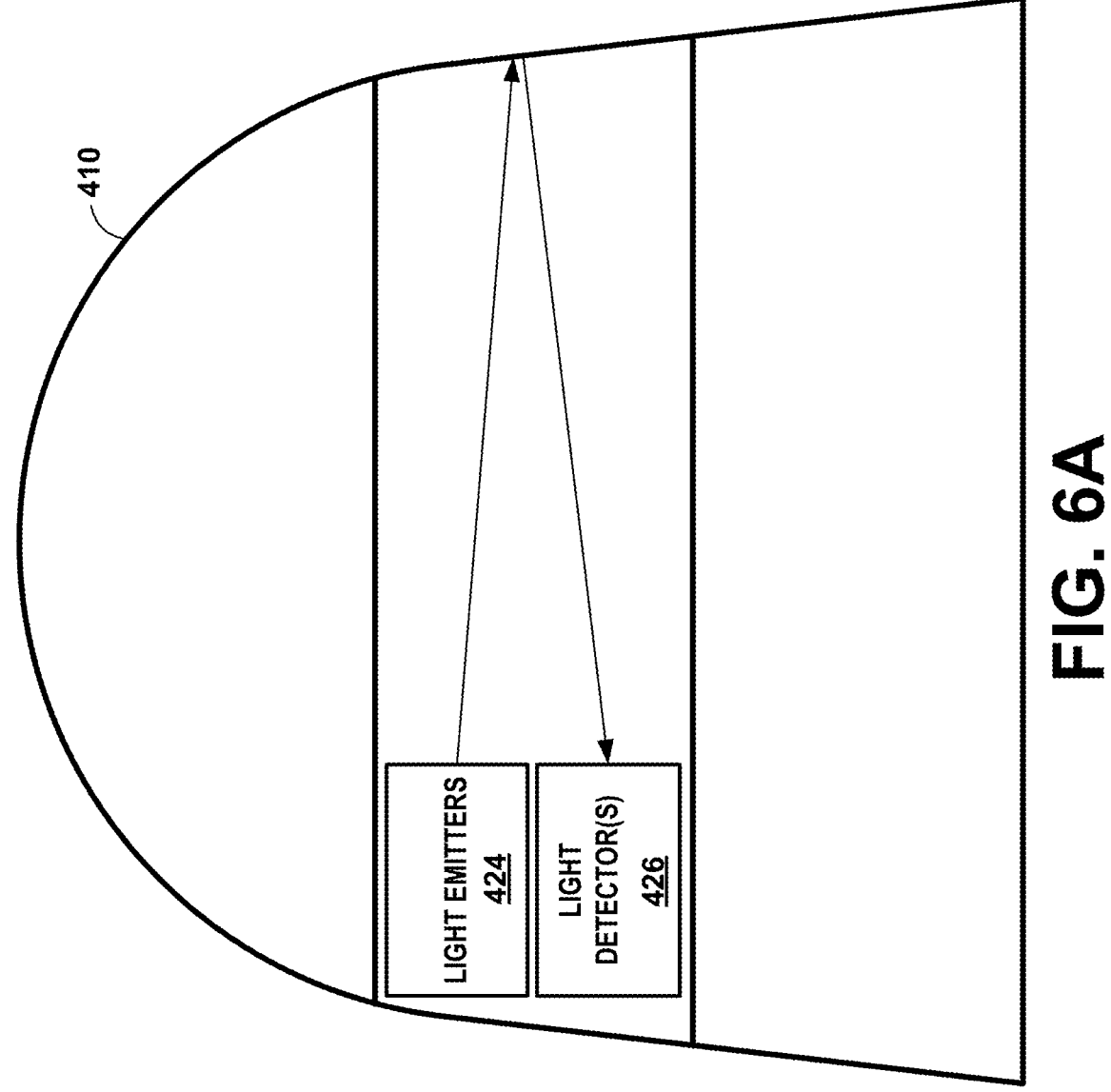
FIG. 6A is an illustration of internal feedback of a lidar device, according to example embodiments.

FIG. 6A is an illustration of internal feedback of a lidar device (e.g., the lidar device 410 shown and described with reference to FIG. 4B), according to example embodiments. For example, as illustrated, light emitters 424 of the lidar device 410 may emit light signals that are consequently detected (e.g., based on reflection of the light signals) by light detectors 426 of the lidar device 410. In some cases, the detected light signals may be the result of internal reflections (e.g., from a housing or optical window of the lidar device 410, as illustrated in FIG. 6A, or from one or more other internal components of the lidar device 410, such as mirrors, waveguides, electronics, circuits, lenses, filters, etc.). Because of the proximity of the internal components of the lidar device 410 to the light detectors 426, in some embodiments, such internal reflections may have a relatively high intensity. Additionally or alternatively, the detection of such internal reflections by the light detectors 426 may saturate the light detectors 426 (e.g., if the light detectors 426 are biased in Geiger mode).

Figure 6B:
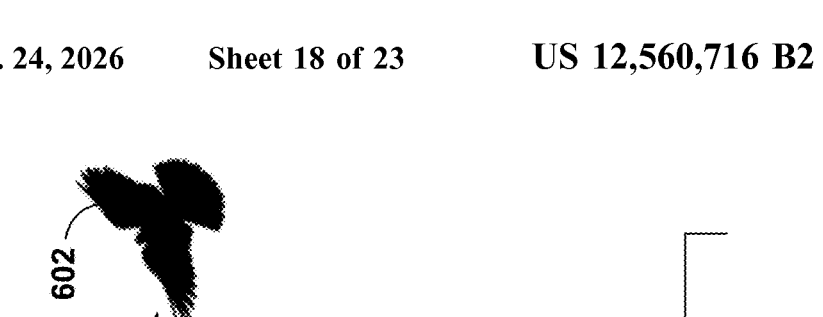
FIG. 6B is an illustration of a detection event that could be affected by unmitigated internal feedback, according to example embodiments.
Figure 6C:
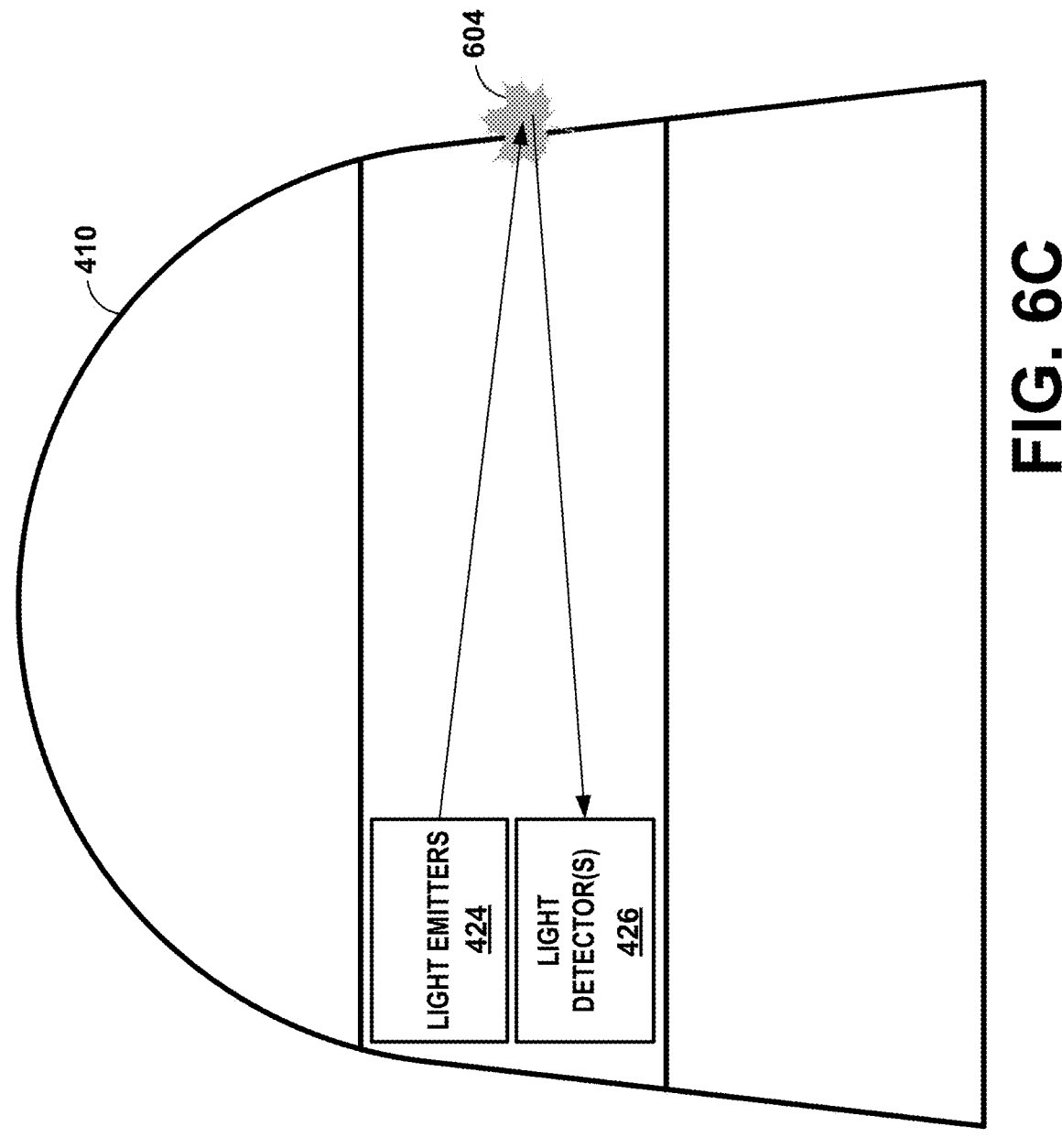
FIG. 6C is an illustration of a detection event that could be affected by unmitigated internal feedback, according to example embodiments.

As described above, upon the light detectors 426 becoming saturated, there may be an associated recovery time during which the light detectors 426 cannot detect additional signals. As such, there may be a time window after detecting an internal reflection (e.g., and upon the light detector 426 becoming saturated) during which a light detector 426 is effectively blinded from detecting objects in the surrounding environment. This time window may correspond to a given set of ranges based on the travel time of light signals emitted by the light emitters 424. For example, objects in the surrounding environment that are relatively close to the lidar device 410 may not be detectable as a result of saturation of the light detectors 426 due to detection of internal reflections. FIG. 6B, for instance, is an illustration of a detection event that might be affected by unmitigated internal feedback, according to example embodiments. As illustrated, there may be an object 602 in the surrounding environment that is close to the lidar device 410 (e.g., within 0.1 m, within 0.3 m as illustrated in FIG. 6B, within 0.5 m, within 0.7 m, within 0.9 m, within 1.0 m, within 1.5 m, within 2.0 m, within 2.5 m, within 3.0 m, etc.). While the object 602 might otherwise be detectable by the lidar device 410 (e.g., based on the emission of a light signal by the light emitters 424 and a detection of a reflected light signal by the light detectors 426), as a result of internal feedback (e.g., saturation of the light detectors 426 due to internal reflections, as illustrated in FIG. 6A), the object 602 may go undetected by the lidar device 410. FIG. 6C is another illustration of a detection event that might be affected by unmitigated internal feedback, according to example embodiments. For example, debris 604 (e.g., a leaf, as illustrated in FIG. 6C; rain; snow; dirt; mud; dust; condensation; dust; insect residue; etc.) present on the surface of the lidar device 410 (e.g., on an exterior of the housing of the lidar device 410) may, like the object 602 illustrated in FIG. 6B, be undetectable as a result of internal feedback (e.g., saturation of the light detectors 426 due to internal reflections, as illustrated in FIG. 6A).

In various situations, it may be desirable for the lidar device 410 to be able to detect objects that are relatively close (e.g., the object 602 illustrated in FIG. 6B) and/or to be able to detect debris 604 (e.g., debris 604 located on an exterior surface of the lidar device 410, as illustrated in FIG. 6C). For example, detecting nearby objects (e.g., the object 602 of FIG. 6B) can be used (e.g., by a vehicle associated with the lidar device 410) to make object avoidance determinations. Further, detecting debris 604 (e.g., as illustrated in FIG. 6C) can be used to identify whether one or more channels of the lidar device 410 is occluded (e.g., and, therefore, unable to detect objects in the surrounding environment). Additionally or alternatively, detecting debris 604 (e.g., as illustrated in FIG. 6C) can be used to identify whether one or more channels of the lidar device 410 is partially occluded. For example, in some embodiments, one or more of the channels of the lidar device 410 may be partially blocked by debris 604 (e.g., 75% occluded, 50% occluded, 25% occluded, etc.), which may result in range detection degradation (e.g., based on a reduction in intensity of a light pulse and/or a variation in distance to a target for one portion of a light pulse compared to another, the distance identified for the detected light pulse based on transit time may be incorrect). As such, as described throughout the disclosure, example embodiments may include techniques to mitigate adverse effects resulting from internal feedback within the lidar device 410 (e.g., by preventing saturation of the light detectors 426 based on detected internal reflections) . For example, techniques described herein may be used to determine the presence of debris and/or a degree (e.g., in terms of percentage) of occlusion based on one or more pieces of debris.

Yet further, in some embodiments, it may be desirable to detect the housing of the lidar device 410, itself. For example, by detecting an optical signal reflected from an optical window defined within an exterior housing of the lidar device 410, a determination can be made (e.g., by a controller of the lidar device 410) of which detection time periods correspond to reflections from inside the lidar device 410 and which detection time periods correspond to reflections from objects in the surrounding environment. In other words, by detecting the housing of the lidar device 410, itself, based on reflected light signals, the point in time corresponding to a target range of 0.0 m can be determined.

In light of these potential benefits, example embodiments also provide techniques for being able to detect the external enclosure (e.g., housing) of the lidar device 410 or other components from the lidar device 410 from which internal feedback may be generated. For example, during a detection time period that corresponds to internal reflections from within the lidar device 410/the external enclosure of the lidar device 410, the light detectors 426 may be biased (e.g., by a biasing circuit using a bias signal) in a linear mode/APD mode (e.g., thereby still allowing the light detectors 426 to detect internal feedback without saturating the light detectors 426), whereas during a detection time period that corresponds to reflections from objects in a surrounding environment, the light detectors 426 may be biased (e.g., by a biasing circuit using a bias signal) in a Geiger mode (e.g., thereby allowing avalanche breakdown to occur in response to a detected light signal).

FIG. 7 is an illustration of a firing sequence 702 and a bias signal 704, according to example embodiments. The firing sequence 702 and the bias signal 704 are coordinated with respect to each other in time, as illustrated in FIG. 7. The firing sequence 702 may represent the light intensity emitted by a light emitter (e.g., one of the light emitters 424 of the lidar device 410 shown and described relative to FIG. 4B) over time or the firing sequence 702 (e.g., in terms of voltage or current) provided to a light emitter (e.g., one of the light emitters 424 of the lidar device 410 shown and described relative to FIG. 4B) over time to cause the light emitter to emit light. The bias signal 704 may represent the voltage bias (e.g., reverse bias voltage) provided to a light detector (e.g., one of the light detectors 426 of the lidar device 410 shown and described relative to FIG. 4B) over time to allow the light detector to detect light signals. For example, the bias signal 704 may represent the output voltage ("Vout") applied to output node 526, as illustrated and described relative to FIG. 5A, over time.

Also labeled in FIG. 7, using dashed vertical lines, are a first time 712, an intermediate time 714, a second time 716, and a third time 718. The first time 712, the intermediate time 714, the second time 716, and the third time 718 may each represent discrete time points within the firing sequence of a light emitter within a lidar device and the detection sequence of a corresponding light detector within the lidar device. As illustrated by the three black dots within the firing and detection sequences of FIG. 7, the firing and detection sequences may be repeated (e.g., indefinitely) to detect data about the surrounding environment of the lidar device (e.g., data used to form a plurality of point clouds for a plurality of points in time). The first time 712 may represent a time at which the light emitter begins firing according to the firing sequence 702. The intermediate time 714 may represent a time at which at least a portion of the light signal emitted by the light emitter has had sufficient time to travel to an external enclosure of the lidar device, be reflected from the external enclosure of the light device, and be detected by the light detector. In other words, the intermediate time 714 may represent the delay time relative to the first time 712 that it takes an emitted light signal to travel to an external enclosure of the lidar device and back to the light detector.

The second time 716 may represent a point in time at which the bias signal 704 results in the light detector being reverse biased in a Geiger-mode regime (e.g., in order to detect objects in the surrounding environment of the lidar device). The third time 718 may represent the beginning of a reset phase during which the light emitter and/or the light detector are reset to prepare for additional firings or detections, respectively. The time window between the first time 712 and the intermediate time 714 may correspond to the time when any internal reflections of light signals emitted by the light emitter off of components within the lidar device would be detected by the light detector. Additionally, the time window between the intermediate time 714 and the third time 718 may correspond to the listening window during which the light detector attempts to detect reflected signals from objects in the surrounding environment (e.g., in order to collect data about distances to objects in the surrounding environment). Further, the time window between the third time 718 and the first time 712 of the subsequent firing sequence/detecting sequence may correspond to the reset phase (e.g., where the light emitter and/or light detector are resetting for subsequent firing sequences/detecting sequences).

As illustrated in FIG. 7, the bias signal 704 (e.g., used by a biasing circuit to bias a light detector) may vary with respect to time. For example, as illustrated, the bias signal 704 may bias the light detector in a debiased-mode regime (e.g., a regime where the light detector would not produce a detectable current in response to an incoming light signal) just prior to the first time 712. Then, after the light emitter fires at the first time 712, the bias signal 704 may increase the reverse bias of the detector (e.g., until the intermediate time 714, until the second time 716, and/or until a time point beyond the second time 716). For example, as illustrated, the bias signal 704 may ramp the bias during the time window between the first time 712 and the intermediate time 714 such that the reverse bias of the detector transitions from a debiased-mode regime into a linear-mode (i.e., APD-mode) regime. Likewise, as illustrated, the bias signal 704 may ramp the bias during the time window between the intermediate time 714 and the second time 716 such that the reverse bias of the detector transitions from a linear-mode (i.e., APD-mode) regime into a Geiger-mode regime. Still further, as illustrated, the bias signal 704 may reverse ramp (i.e., ramp from high to low) the bias during the time window between the third time 718 and the subsequent first time 712 (i.e., during the reset phase) from a Geiger-mode regime to a linear-mode (i.e., APD-mode) regime to a debiased-mode regime. While the regimes illustrated in FIG. 7 are clearly delineated by the dashed lines, it is understood that in some embodiments these regimes may have some overlap, may be be less clearly defined, and/or may depend on other factors (e.g., temperature). Hence, the regimes illustrated in FIG. 7 are provided by way of example and are not to be construed as limiting.

Ramp durations may be defined between two or more of the time points listed. For example, a ramp duration may be defined between the first time 712 and the intermediate time 714, between the intermediate time 714 and the second time 716, between the first time 712 and the second time 716, etc. Further, in some embodiments, one or more of the ramp durations may be adjustable. For example, a controller (e.g., of the lidar device) may be configured to cause a biasing circuit to adjust the bias signal in order or to adjust one or more of the ramp durations. For instance, the controller may cause the biasing circuit to adjust a ramp duration (e.g., the ramp duration between the first time 712 and the second time 716) based on a desired minimum-detectable distance to a target in the surrounding environment (e.g., the ramp duration between the first time 712 and the second time 716 may be adjusted if it is desired to detect objects that are as close as 0.5 m compared with if it is desired to detect objects that are as close as 5.0 m).

The bias ramping/reverse ramping described above may be done in a variety of ways. For example, the bias signal 704 may be ramped linearly from the first time 712 to the intermediate time 714 and/or from the intermediate time 714 to the second time 716. An example bias signal with such a ramping is illustrated in FIG. 8A (e.g., the bias signal 704 is ramped linearly from the first time 712 to the intermediate time 714, from the intermediate time 714 to the second time 716, and, as such, from the first time 712 to the second time 716). In other embodiments, the bias signal 704 may be ramped exponentially from the first time 712 to the intermediate time 714, from the intermediate time 714 to the second time 716, and from the first time 712 to the third time 718 (e.g., as illustrated in FIG. 8B). In still other embodiments, the bias signal 704 may be ramped logarithmically from the first time 712 to the intermediate time 714, from the intermediate time 714 to the second time 716, and from the first time 712 to the third time 718 (e.g., as illustrated in FIG. 8C).

Other ramping techniques are also possible and are contemplated herein. For example, the bias signal could be ramped quadratically. In still other embodiments, the bias signal may be ramped in a piecewise fashion (e.g., across multiple ramping stages). For instance, the bias signal may be: ramped exponentially during a first time segment (e.g., for the first 10% of the time window between the first time 712 and the second time 716), ramped linearly during a second time segment (e.g., from 10% of the time window between the first time 712 and the second time 716 to 90% of the time window between the first time 712 and the second time 716), and ramped exponentially during a third time segment (e.g., for the last 10% of the time window between the first time 712 and the second time 716). Alternatively, the bias signal may be ramped linearly with a first slope during a first time segment (e.g., for the first 50% of the time window between the first time 712 and the second time 716) and then ramped linearly with a second slop during a second time segment (e.g., for the second 50% of the time window between the first time 712 and the second time 716). Other piecewise bias ramping schemes are also possible and are contemplated herein.

Further, in some embodiments, the bias signal 704 may be ramped from the first time 712 to the intermediate time 714 such that the reverse-bias voltage at the intermediate time 714 is only slightly less than the minimum voltage corresponding to the Geiger-mode regime (e.g., may be about 80% of the minimum voltage corresponding to the Geiger-mode regime, may be about 85% of the minimum voltage corresponding to the Geiger-mode regime, may be about 90% of the minimum voltage corresponding to the Geiger-mode regime, may be about 95% of the minimum voltage corresponding to the Geiger-mode regime, may be about 99% of the minimum voltage corresponding to the Geiger-mode regime, may be about 99.9% of the minimum voltage corresponding to the Geiger-mode regime, etc.). This may allow the bias signal to transition the detector from linear mode to Geiger mode very shortly after the intermediate time 714 (e.g., which corresponds to detection distances that are just beyond the external enclosure of the corresponding lidar device). In such embodiments, the second time 716 may be very close in time to the intermediate time 714. In some embodiments, it may be desirable to minimize the duration between the intermediate time 714 and the second time 716 to allow for detection of objects that are relatively close to the external enclosure of the lidar device (e.g., the debris 604 illustrated in FIG. 6C).

In some embodiments, the light detector to which the bias signal 704 is applied may include a SiPM. Further, in such embodiments, the debiased-mode regime may correspond to reverse bias voltages between 0 V and about 10 V, the linear-mode regime (i.e., APD-mode regime) may correspond to reverse bias voltages between about 10 V and about 50 V, and the Geiger-mode regime may correspond to reverse bias voltages above about 50 V. For example, the bias level at the second time 716 may have a value between about 30 V and about 70 V (e.g., between 45 V and 55 V, such as 50 V). It is understood that these voltages values are provided solely as examples and that other voltages for the bias regimes are also possible and are contemplated herein.

It is understood that the bias signal 704 illustrated in FIG. 7 is provided solely as an example and that other bias signals are also possible and contemplated herein. Further, in some embodiments, a lidar device may include multiple pairs of light detectors/light emitters. Two or more of the pairs of light detectors/light emitters may have different bias signals for one another. For example, one light detector/light emitter pair may have a bias signal that has a bias ramp with a different shape from the bias signal of the other light detector/light emitter pair. Additionally or alternatively, one light detector/light emitter pair may have a bias signal with a bias ramp with a different ramp duration from the bias signal of the other light detector/light emitter pair. Still further, in some embodiments, one light detector/light emitter pair may include a bias signal having a bias ramp that ramps to a different maximum bias voltage than the bias signal of the other light detector/light emitter pair. Even further, in some embodiments, portions of the firing sequence (e.g., the entire firing sequence) might be delayed for one light detector/light emitter pair compared to another. Yet further, in some embodiments, portions of the detecting sequence (e.g., the entire detecting sequence) might be delayed for one light detector/light emitter pair compared to another. In still other embodiments, the maximum reverse bias reached by the bias signal (e.g., within a Geiger-mode regime) may be higher for one light detector/light emitter pair than for another. Such differences between bias signals for different light emitter/light detector pairs may be based on differing locations within the lidar device relative to internal components of the lidar device (e.g., one light detector may be closer to an external enclosure of the lidar device than another light detector) or different components used for the light detector (e.g., different detector types) and/or the light emitter (e.g., different emitter types).

In some embodiments, the reverse-bias voltage values for each of the voltage regimes may depend, at least in part, on a temperature of the light detector. As such, the bias signal may be adjusted (e.g., using a controller configured to cause the biasing circuit to adjust the bias signal) based on a temperature (e.g., an ambient temperature and/or a temperature of the light detector, itself). For example, a controller may be configured to cause a biasing circuit to increase a slope along at least one portion of the bias signal in response to an increase in the temperature of the light detector or decrease a slope along at least one portion of the bias signal in response to a decrease in the temperature of the light detector. Additionally or alternatively, a controller may be configured to cause the biasing circuit to increase the second bias level in response to an increase in the temperature of the light detector or decrease the second bias level in response to a decrease in the temperature of the light detector. Still further, a controller may be configured to adjust the ramp duration of the bias signal based on the temperature of the light detector. In some embodiments, the lidar device may include a temperature sensor configured to measure the temperature of the light detector or the temperature near the light detector. As such, the controller may be communicatively coupled to the temperature sensor and configured to determine the temperature of the light detector based on data received from the temperature sensor. The controller may make adjustments to the bias signal based on the data from the temperature sensor, for example.

Figure 9A:
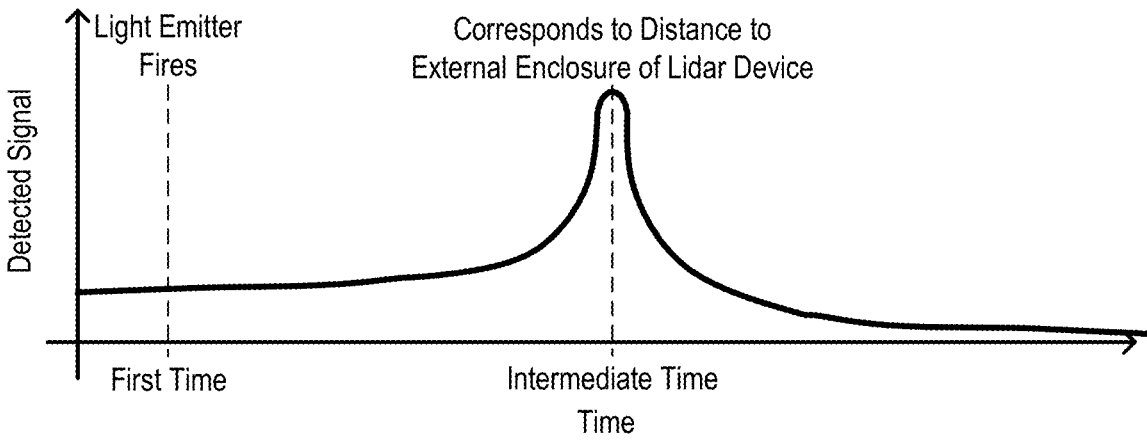
FIG. 9A is an illustration of a detected calibration signal, according to example embodiments.

In some embodiments, one or more calibration measurements may be taken (e.g., before each run-time measurement is to be taken; at regular intervals, such as after every two, three, four, five, etc. run-time measurements; on initialization/power on of the lidar device and/or light detector; based on an instruction from a controller of the lidar device, such as when the controller determines that obstructions like rain or debris are present on an external enclosure of the lidar device; and/or during fabrication/assembly of the lidar device). A "run-time measurement," as used herein, may be a measurement taken in an attempt to observe/sense one or more aspects of the surrounding environment (e.g., in order to make one or more control decisions. Such a "run-time measurement" may be unlike a "calibration measurement" in that a "calibration measurement" may be made solely to ensure proper functionality of the lidar device. Further, such calibration measurements may be used (e.g., by a controller) to modify one or more aspects of the bias signal used by the biasing circuit to bias the light detector. Additionally or alternatively, such calibration measurements may be used (e.g., by a controller) to analyze detection data received from the light detector of the lidar device. For example, in some embodiments, a controller may cause a light emitter to emit a calibration signal (e.g., according to a firing sequence to be used in run-time) after which the light detector (e.g., while having a bias signal applied that will ultimately be used run-time) may detect the calibration signal (e.g., after the calibration signal has been reflected from one or more internal components of the lidar device). FIG. 9A may represent an example detected calibration signal, for example. As illustrated, the detected calibration signal may include a pulse (e.g., corresponding to a calibration pulse emitted by the light emitter) that peaks at the intermediate time (e.g., the intermediate time 714 shown and described with reference to FIG. 7).

Figure 9B:
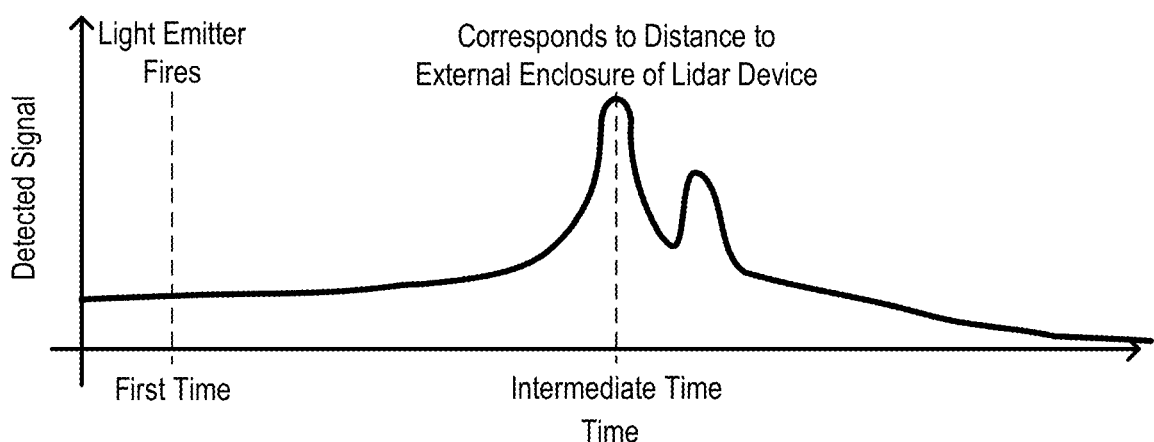
FIG. 9B is an illustration of a detected object-detection signal, according to example embodiments.

After emitting and detecting a calibration signal, the lidar device may proceed to emitting and detecting an object-detection signal (e.g., in run-time). An object-detection signal may be used to detect one or more objects in a surrounding environment (e.g., objects that are outside of an external enclosure of the lidar device). Such object-detection signals may be used to determine: distances to objects in a surrounding environment (e.g., to include within a point cloud) and/or qualities of surfaces of objects in a surrounding environment (e.g., the reflectivity of an object in a surrounding environment). FIG. 9B is an illustration of an object-detection signal that has been detected by a light detector of a lidar device. The light detector used to detect the object-detection signal of FIG. 9B may be biased using the bias signal illustrated in FIG. 7, for example. Additionally or alternatively, the light detector used to detect the object-detection signal of FIG. 9B may be biased using the same bias signal used to bias the light detector used to detect the calibration signal as shown and described with reference to FIG. 9A.

As illustrated in FIG. 9B, the detected object-detection signal may have two peaks in intensity (e.g., one that corresponds to a distance to an external enclosure of the lidar device and another that corresponds to an object in the surrounding environment). The light detector may be capable of detecting both a peak corresponding to the external enclosure of the lidar device and a peak corresponding to an object in the surrounding environment (e.g., an object that is on an exterior surface of the external enclosure of the lidar device, an object that is about 0.1 m from the external enclosure of the lidar device, an object that is about 0.2 m from the external enclosure of the lidar device, an object that is about 0.3 m from the external enclosure of the lidar device, etc.) because the light detector is biased according to the biasing techniques described herein (e.g., which prevent the light detector from saturating as a result of internal feedback). The peak corresponding to the external enclosure of the lidar device may be used to determine a location of the external enclosure of the lidar device (e.g., in order to determine the location, in detection time and/or physical space, of the interface between the external enclosure of the lidar device and the surrounding environment). The peak corresponding to the object may be used to determine a location of the object relative to the lidar device (e.g., in order to determine a distance, in detection time and/or physical space, between the external enclosure of the lidar device and the object).

Figure 9C:
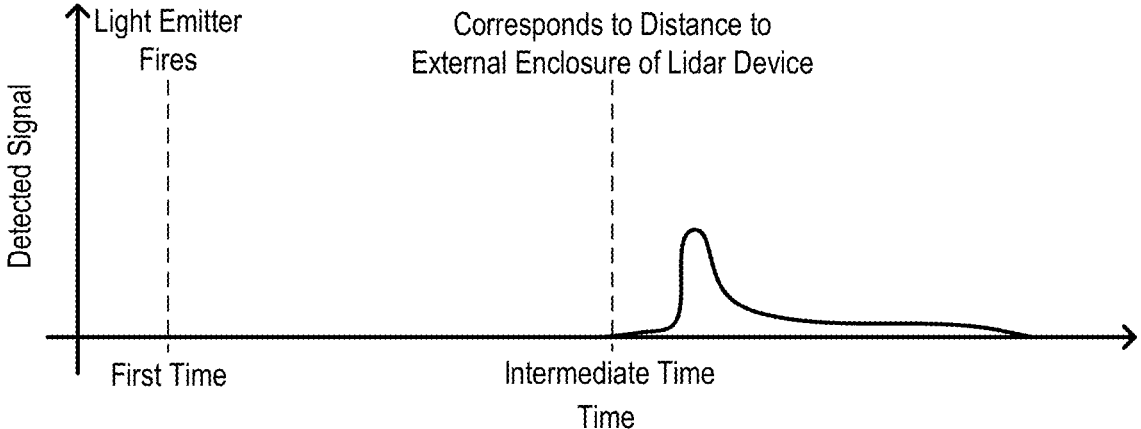
FIG. 9C is an illustration of a difference signal, according to example embodiments.

In order to analyze only the portion of the detected object-detection signal that corresponds to the detected object, the portion of the detected object-detection signal that corresponds to internal feedback may be removed from the detected object-detection signal. For example, a controller of the lidar device may receive a detected calibration signal (e.g., the detected calibration signal illustrated in FIG. 9A) from a light detector and subsequently receive a detected object-detection signal (e.g., the detected object-detection signal illustrated in FIG. 9B) from the light detector. Then, the controller may subtract the detected calibration signal from the detected object-detection signal in order to produce a difference signal (e.g., representing only the portion of the detected object-detection signal that corresponds to an object in the surrounding environment). An example difference signal (i.e., modified object-detection signal) is illustrated in FIG. 9C. As illustrated, the difference signal may include one peak corresponding to an object in the surrounding environment.

While a calibration signal is described above as being usable to remove the influence of internal reflections on a detected object-detection signal, it is understood that emitting and detecting a calibration signal (e.g., as illustrated in FIG. 9A) may be performed for additional or alternative purposes. For example, a calibration signal may be used to determine the influence of the bias signal, itself, on detection circuitry of the light detector. The bias signal may, even in the complete absence of detected light by the light detector, provide some measurable signal at an output of the light detector (e.g., in the ADC 534 shown and described with respect to FIG. 5B). Hence, a calibration measurement may be made such that the influence of the bias signal can be later removed from run-time measurements. Such a calibration measurement may include biasing the light detector with the same bias signal that will ultimately be used in run-time. Further, in some embodiments of such a calibration measurement, a calibration light signal may be emitted by the light emitter (e.g., and subsequently detected by the light detector, thereby combining the influence of the bias signal, itself, with the influence of the detected internal reflections from the lidar device in a single calibration measurement), while in other embodiments, no light signal will be emitted by the light emitter (e.g., thereby isolating only the influence of the bias signal in the calibration measurement). Other forms of calibration measurements are also possible and are contemplated herein.

Figure 10:
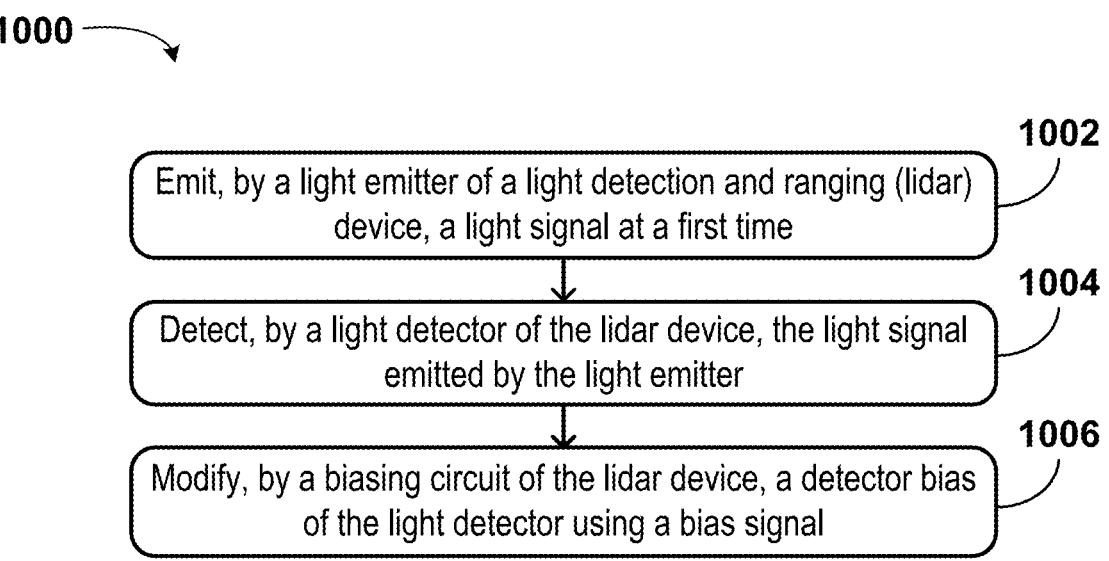
FIG. 10 is a flowchart diagram of a method, according to example embodiments.

FIG. 10 is a flowchart diagram of a method 1000, according to example embodiments. In some embodiments, the method 1000 may be performed by a lidar device (e.g., the lidar device 410 shown and described with reference to FIGS. 4A and 4B).

At block 1002, the method 1000 may include emitting, by a light emitter of a light detection and ranging (lidar) device, a light signal at a first time.

At block 1004, the method 1000 may include detecting, by a light detector of the lidar device, the light signal emitted by the light emitter.

At block 1006, the method 1000 may include modifying, by a biasing circuit of the lidar device, a detector bias of the light detector using a bias signal. The bias signal may ramp the detector bias from a first bias level at the first time to a second bias level at a second time. The second time may occur after the first time and may be separated from the first time by a ramp duration. The second bias level may be greater than the first bias level. The ramp duration may be sufficient to prevent any internal feedback within the lidar device caused by the emitted light signal from saturating the light detector or detection circuitry associated with the light detector.

In some embodiments of the method 1000, block 1004 may include detecting, by the light detector of the lidar device, a first portion of the light signal that corresponds to internal feedback within the lidar device caused by the emitted light signal. Further, block 1004 may include detecting, by the light detector of the lidar device, a second portion of the light signal that corresponds to a reflection of the light signal from one or more objects in a surrounding environment.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A light detection and ranging (lidar) device comprising:
a light emitter configured to emit a light signal at a first time;
a light detector configured to detect the light signal emitted by the light emitter;
a biasing circuit configured to modify a detector bias of the light detector using a bias signal,
wherein the bias signal ramps the detector bias from a first bias level at the first time to a second bias level at a second time,
wherein the second time occurs after the first time and is separated from the first time by a ramp duration,
wherein the second bias level is greater than the first bias level, and
wherein the ramp duration is sufficient to prevent any internal feedback within the lidar device caused by the emitted light signal from saturating the light detector or detection circuitry associated with the light detector; and
a controller configured to:
cause the light emitter to emit a calibration signal;
receive a detected calibration signal from the light detector, wherein the detected calibration signal was detected by the light detector based on the emitted calibration signal while the biasing circuit was modifying the detector bias of the light detector using the bias signal;
cause the light emitter to emit an object-detection signal;
receive a detected object-detection signal from the light detector, wherein the detected object-detection signal was detected by the light detector based on the emitted object-detection signal while the biasing circuit was modifying the detector bias of the light detector using the bias signal; and
generate a modified object-detection signal by subtracting the detected calibration signal from the detected object-detection signal.

2. The lidar device of claim 1, wherein the light detector comprises one or more silicon photomultipliers (SiPMs).

3. The lidar device of claim 2, wherein the first bias level corresponds to a linear mode of the one or more SiPMs, and wherein the second bias level corresponds to a Geiger mode of the one or more SiPMs.

4. The lidar device of claim 1, further comprising a housing, wherein the ramp duration is:
at least as long as a transit time for the light signal to propagate from the light emitter to the housing and then from the housing back to the light detector; or
at least as long as a transit time for the light signal to propagate from the light emitter to debris disposed on the housing and then from the debris disposed on the housing back to the light detector.

5. The lidar device of claim 1, wherein the bias signal ramps the detector bias from the first bias level at the first time to the second bias level at the second time in three stages, and wherein the three stages comprise:
a first non-linear stage that ramps from the first bias level to a first intermediate bias level;
a linear stage that ramps from the first intermediate bias level to a second intermediate bias level; and
a second non-linear stage that ramps from the second intermediate bias level to the second bias level.

6. The lidar device of claim 1, wherein the bias signal ramps the detector bias from the first bias level at the first time to the second bias level in one or more stages, and wherein the one or more stages comprises a stage that exponentially ramps the detector bias.

7. The lidar device of claim 1, wherein the bias signal ramps the detector bias from the first bias level at the first time to the second bias level in one or more stages, and wherein the one or more stages comprises a stage that logarithmically ramps the detector bias.

8. The lidar device of claim 1, wherein the controller is configured to cause the biasing circuit to adjust the bias signal, and wherein the controller is configured to cause the biasing circuit to adjust the ramp duration of the bias signal based on a desired minimum-detectable distance to a target in a surrounding environment.

9. The lidar device of claim 1, further comprising an external enclosure, wherein the second time corresponds to a detection time associated with a distance from the light emitter to the external enclosure to the light detector.

10. The lidar device of claim 1, wherein generating the modified object-detection signal comprises:
removing, from the detected object-detection signal, an influence of the bias signal on detection circuitry of the light detector; or
removing, from the detected object-detection signal, an influence of the internal feedback within the lidar device caused by the emitted light signal.

11. The lidar device of claim 1, wherein the controller is configured to cause the biasing circuit to adjust the bias signal based on a temperature of the light detector.

12. The lidar device of claim 11, wherein the controller is configured to cause the biasing circuit to:

increase a slope along at least one portion of the bias signal in response to an increase in the temperature of the light detector; or decrease a slope along at least one portion of the bias signal in response to a decrease in the temperature of the light detector.

13. The lidar device of claim 11, wherein the controller is configured to cause the biasing circuit to:

increase the second bias level in response to an increase in the temperature of the light detector; or decrease the second bias level in response to a decrease in the temperature of the light detector.

14. The lidar device of claim 11, wherein the controller is configured to adjust the ramp duration based on the temperature of the light detector.

15. The lidar device of claim 11, further comprising a temperature sensor configured to measure the temperature of the light detector or near the light detector, wherein the controller is communicatively coupled to the temperature sensor, and wherein the controller is configured to determine the temperature of the light detector based on data received from the temperature sensor.

16. The lidar device of claim 1, wherein the biasing circuit comprises:

a capacitor configured to store charge in order to produce a voltage differential across terminals of the capacitor;

a boost converter configured to charge the capacitor based on a voltage input; and one or more switching devices used with the capacitor to selectively produce a voltage differential across the light detector, resulting in the detector bias.

17. The lidar device of claim 1, wherein the second bias level is between about 30 V and about 70 V.

18. A method comprising:

emitting, by a light emitter of a light detection and ranging (lidar) device, a light signal at a first time;

detecting, by a light detector of the lidar device, the light signal emitted by the light emitter;

modifying, by a biasing circuit of the lidar device, a detector bias of the light detector using a bias signal, wherein the bias signal ramps the detector bias from a first bias level at the first time to a second bias level at a second time, wherein the second time occurs after the first time and is separated from the first time by a ramp duration, wherein the second bias level is greater than the first bias level, and wherein the ramp duration is sufficient to prevent any internal feedback within the lidar device caused by the emitted light signal from saturating the light detector or detection circuitry associated with the light detector;

causing, by a controller of the lidar device, the light emitter to emit a calibration signal;

receiving, by the controller of the lidar device, a detected calibration signal from the light detector, wherein the detected calibration signal was detected by the light detector based on the emitted calibration signal while the biasing circuit was modifying the detector bias of the light detector using the bias signal;

causing, by the controller of the lidar device, the light emitter to emit an object-detection signal;

receiving, by the controller of the lidar device, a detected object-detection signal from the light detector, wherein the detected object-detection signal was detected by the light detector based on the emitted object-detection signal while the biasing circuit was modifying the detector bias of the light detector using the bias signal; and generating, by the controller of the lidar device, a modified object-detection signal by subtracting the detected calibration signal from the detected object-detection signal.

19. The method of claim 18, wherein detecting, by the light detector of the lidar device, the light signal comprises:

detecting, by the light detector of the lidar device, a first portion of the light signal that corresponds to internal feedback within the lidar device caused by the emitted light signal; and detecting, by the light detector of the lidar device, a second portion of the light signal that corresponds to a reflection of the light signal from one or more objects in a surrounding environment.

20. A light detection and ranging (lidar) device comprising:

a plurality of light emitters, wherein each light emitter is configured to emit a light signal at a corresponding first time;

a plurality of light detectors, wherein each light detector corresponds to at least one light emitter of the plurality of light emitters, and wherein each light detector is configured to detect the light signal emitted by the light emitters to which the light detector corresponds;

a biasing circuit configured to modify a detector bias for one or more light detectors of the plurality of light detectors using one or more bias signals, wherein each bias signal ramps the detector bias for the one or more corresponding light detectors from a corresponding first bias level at the corresponding first time to a corresponding second bias level at a corresponding second time, wherein each corresponding second time occurs after the corresponding first time and is separated from the corresponding first time by a corresponding ramp duration, wherein each second bias level is greater than the corresponding first bias level, and wherein each ramp duration is sufficient to prevent any internal feedback within the lidar device caused by the corresponding emitted light signal from saturating the corresponding light detector or detection circuitry associated with the corresponding light detector; and a controller configured to:

cause a first light emitter of the plurality of light emitters to emit a calibration signal;

receive a detected calibration signal from a first light detector of the plurality of light detectors, wherein the first light detector corresponds to the first light, wherein the detected calibration signal was detected by the first light detector based on the emitted calibration signal while the biasing circuit was modifying the detector bias of the first light detector using the bias signal;

cause the first light emitter to emit an object-detection signal;

receive a detected object-detection signal from the first light detector, wherein the detected object-detection signal was detected by the first light detector based on the emitted object-detection signal while the biasing circuit was modifying the detector bias of the first light detector using the bias signal; and generate a modified object-detection signal by subtracting the detected calibration signal from the detected object-detection signal.

* * * * *